United States Patent
Such

(10) Patent No.: US 7,243,696 B2
(45) Date of Patent: Jul. 17, 2007

(54) EDGE MODIFICATION APPARATUS

(75) Inventor: Duncan Karl Such, Auckland (NZ)

(73) Assignees: Gregory John O'Connell, Auckland (NZ); Iain Michael Hutcheson, Auckland (NZ)

( * ) Notice: Subject to any disclaimer, the term of this patent is extended or adjusted under 35 U.S.C. 154(b) by 369 days.

(21) Appl. No.: 10/344,932

(22) PCT Filed: Aug. 20, 2001

(86) PCT No.: PCT/NZ01/00166

§ 371 (c)(1),
(2), (4) Date: Jul. 16, 2003

(87) PCT Pub. No.: WO02/14033

PCT Pub. Date: Feb. 21, 2002

(65) Prior Publication Data

US 2004/0011460 A1    Jan. 22, 2004

(30) Foreign Application Priority Data

Aug. 18, 2000  (NZ) .................................. 506425
Jan. 26, 2001  (NZ) .................................. 509628

(51) Int. Cl.
  *B32B 37/00*  (2006.01)
  *B32B 41/00*  (2006.01)
(52) U.S. Cl. ........................ 156/358; 156/447
(58) Field of Classification Search ............... 156/350, 156/358, 447
See application file for complete search history.

(56) References Cited

U.S. PATENT DOCUMENTS 5,246,533 A * 9/1993 Mochizuki .................. 156/475
5,992,488 A * 11/1999 Bortolini ..................... 156/351

FOREIGN PATENT DOCUMENTS

| DE | 2545886 A1 | 4/1977 |
| DE | 3517194 A1 | 11/1986 |
| DE | 3702154 A1 | 8/1988 |
| DE | 3914461 A1 | 11/1990 |
| EP | 0728561 A1 | 8/1996 |
| EP | 0945235 A2 | 9/1999 |

OTHER PUBLICATIONS

English language trnaslation of DE 3517194A1, Franz et al.*

* cited by examiner

Primary Examiner—Richard Crispino
Assistant Examiner—Barbara Musser
(74) Attorney, Agent, or Firm—Jacobson Holman PLLC

(57) ABSTRACT

An edge modification apparatus for the modification of at least part of edge of a panel. An edge follower with an edge contact roller to follow at least part of the profile of the panel. A support structure to allow movement of the edge follower relative to the panel. An edge sensor capable of determining the slope of the profile of the edge. A force applicator to apply a vectored force to the edge follower to press the at least one contact roller onto the edge of the panel. The force applicator is such that the resultant force to the edge follower is in a direction to press the at least one contact roller onto the edge and substantially not along the edge (save for optionally a very small component in the direction of travel of the edge follower along the profile) wherein relative movement between the edge follower and the planar object induces movement of the edge follower. The edge follower modifies the edge of the panel.

43 Claims, 19 Drawing Sheets

EDGE MODIFICATION APPARATUS

This is a nationalization of PCT/NZ01/00166, filed Aug. 20, 2001 and published in English.

TECHNICAL FIELD

The present invention relates to edge modification apparatus and methods therefor, and in particular although not solely to an edging apparatus for applying an edging tape to furniture components.

BACKGROUND ART

It is known to apply edging around the perimeter of tables or other planar objects used in the construction of furniture. Such edging, whether wood veneer, plastic, melteca or formica, affords furniture such as table tops a degree of durability and wear resistance that would otherwise be nonexistent if no edging were to be applied. It also enhances the appearance of such objects. It is common for edging to be applied continuously using a variety of different techniques which vary in their complexity, cost, and reliability. Hand lay-up techniques are most common but usually demand a certain amount of skill on the part of the operator. Such techniques have the disadvantage of creating variability in the final product as the degree of adhesion is reliant upon the pressing force applied to the edging during deposition as well as the orientation of the force in relation to the edge of the object. Hand laying techniques are also labor intensive and can be expensive for large volume work. Alternative techniques rely upon modern CNC (Computer Numerical Control) of a presser head. CNC machines rely on preprogrammed information on the shape of the object to follow its contour and simultaneously apply the tape. Such systems also but tend to be costly and slow, with machining of the edge necessary prior to the application of the edging, in order to ensure the path the machine follows is commensurate with the object.

Searching that has been conducted has located several patents specifications. These include DE 3517194 which is a system which uses a sensor arm(s) to determine the proximity of the aggregate to the workpiece. This sensor arm determines the direction and velocity of each axis drive to cause the gluing/taping system to progress at constant speed around the workpiece. The disadvantages of this system are its complexity, the effort needed to load the turntable with filler pieces so as to make the tape process continue from one piece to another, the limits of shape which can be handled due to the inability of the turntable to reverse direction and handle deep convex shapes. It is also possible that the pivot shaft may foul on the workpiece if the curvature is too tight.

DE 39 14461 describes a system of loading a coil of tape (just sufficient to clash one workpiece) on the aggregate so it is of minimal size and weight ensuring good following of the shape. The unit is controlled by Numerical Control (NC). Its disadvantage is that it is a very expensive solution since it uses complicated and expensive technology and requires expert technicians to service.

DE3702154 is for an NC controlled system with limited aggregate flexibility. The aggregate is unable to swivel so as to enable full 360° edging of panels. Construction is very expensive as with all NC systems.

The invention of EP 07 28561 revolves around a system (NC) where the various aggregates are able to be picked up from a tool magazine (gluing, taping, routing, trimming etc). The main motor can provide the driving motive for each different aggregate. It also utilizes a supply station which carries the majority of the gluing ledging technology. Thus the main tape magazine glue reservoir etc is held in the supply station and the gluing aggregate picks up just sufficient tape, glue etc to clash each workpiece only and has similar disadvantages as for DE 3914461.

EP945235 of Morbideli is a system (NC) where the glue is applied to the workpiece (just before the tape is applied) rather than to the tape itself—allowing more glue to be applied and hence a better bond. Its disadvantages are as per other NC systems which make these machines very expensive.

It is an object of the present invention to provide an edge modification apparatus and related method which will provide improvements to the abovementioned disadvantages or which will at least provide the public with a useful choice.

SUMMARY OF THE INVENTION

Accordingly in the first aspect the present invention consists in an edge modification apparatus for the modification of at least part of an edge of a substantially planar panel said edge defining a perimeter of an arbitrary profile, said apparatus comprising:

a means to mount said panel on a fixed structure, an edge follower including at least one edge contact roller to follow at least part of the perimeter of said panel, an edge follower support structure to allow displacement of said edge follower relative to said fixed structure and when in use, relative to a said panel, an edge sensor capable of determining the slope of said profile at said edge follower relative to a fixed frame of reference, force application means to apply a vectored force to said edge follower to press said at least one contact roller onto the edge of said panel, said force application means capable of vectoring the force applied to said edge follower relative to said fixed frame of reference and in response to the edge sensor, in a manner to vector the resultant force to said edge follower in a direction a) to press said at least one contact roller onto said edge, and b) substantially not along said edge (save for optionally a very small component in or against the direction of travel of said edge follower along said profile), means to generate relative movement between said edge follower and said planar object to thereby induce movement of said edge follower along at least part of the profile, and wherein said edge follower includes a means to modify which as said edge follower progresses along said edge of said panel it at least part modifies the edge of said panel.

Preferably said means to generate movement is provided by at least one driven roller of said edge follower having an axis of rotation substantially parallel to the normal of the major surfaces of said planar panel, wherein said driven roller is in use pressed against the edge of said panel to generate relative movement between said edge follower and said panel.

Preferably said driven roller is the or at least one of said at least one edge contact roller.

Preferably said edge modification apparatus is an edge taping device wherein said means to modify is adapted for the application of tape to the edge of said panel.

Preferably said edge follower is a means for applying tape to the edge of said panel.

Preferably said edge follower consists of a unit which includes a tape feeding means which in use supports a roll of tape and allows for the feed of tape onto the edge of said panel, and at least one pressure roller rotatable about an axis parallel to the normal of the major surfaces of said panel and in use presses said tape onto the edge of said panel.

Preferably said at least one pressure roller is a driven roller.

Preferably said at least one driven roller is provided in addition to said pressure roller.

Preferably said unit also includes a glue applicator to apply glue to the edge contact face of said tape prior to it being pressed onto said edge.

Preferably said apparatus does not rely on pre programmed numerical control for the positioning of said edge follower.

Preferably said sensing means is able to sense the angle of the profile of the edge at where said edge follower is pressed relative to said frame of reference by being responsive to the angle defined between a feeler roller which is forced to remain in contact with the edge and a contact roller of said edge follower relative to said frame of reference.

Preferably said unit is rotatably mounted from said edge follower support structure, said rotation controlled by a biasing means to bias the rotation of said unit relative to said edge follower support structure in a rotational direction to press a leading or trailing edge contact roller to the first mentioned contact roller(s) also engaged with the edge of said panel.

Preferably said leading trailing roller is provided to be disposed from said unit such that the unit is positioned relative to the panel in a position to keep (as it progresses about the perimeter) at least a major portion of said unit outside of the perimeter of the panel.

Preferably said edge follower is capable of moving along the entire profile of said panel.

Preferably said means to mount said panel to said fixed structure mounts said panel in a non rotatable manner relative thereto.

Preferably said edge follower support structure is a gantry arrangement supported by and movable relative to said fixed structure, said gantry arrangement comprising a bridging portion located to said fixed structure and translationally movable relative there to along a first path of travel, and a traveler located to said bridging structure and translationally movable relative there to along a second path of travel being transverse to said first path, wherein said edge follower is mounted from said traveler to be displaced by said gantry arrangement in a cartesian coordinate frame of reference, relative to said fixed structure.

Preferably said transverse direction is at 90 degrees.

Preferably said edge follower is rotationally mounted from said traveler.

Preferably the axis of rotation of said edge follower to said traveler is parallel to the normal of the major surfaces of said panel.

Preferably said axis of rotation of said edge follower to said traveler is coaxial with the edge contact roller.

Preferably said edge follower support structure is a swing arm arrangement supported by and movable relative to said fixed structure, said swing arm arrangement comprising an arm pivotably located to said fixed structure about an axis of rotation, and a traveler provided to said arm translationally movable along at least part of said arm wherein said edge follower is mounted from said traveler to be displaced by said swing arm arrangement in a polar coordinate frame of reference, relative to said fixed structure.

Preferably said edge sensor provides feed back of the angle of said edge at said edge follower (preferably at where said at least one edge contact roller is pressed against the edge) relative to said frame of reference.

Preferably said edge sensor is defined by a means providing two point contact at two spaced apart points on said edge wherein an angle detection means is provided to determine the angle between said two points of contact relative to said frame of reference.

Preferably said means to provide two point contact are edge feelers.

Preferably said two edge feelers are biased in use towards said edge, and wherein said edge feelers are engaged to each other to be pivoted about a common pivot axle.

Preferably said angle detection device operates to determine the angle of rotation of said axle.

Preferably said edge sensor includes an angle detection device to detect the angle between two of said edge contact rollers.

Preferably one said edge contact roller and a feeler roller.

Preferably said feeler roller is in advance in the direction of travel, relative to said edge contact roller.

Preferably said feeler roller trails (in the direction of travel) the one edge contact roller.

Preferably said edge sensor includes an angle detection device to detect the angle between an at least one edge contact roller and a feeler roller which is disposed from said edge follower by a linkage arm, said linkage arm being pivotable about said edge follower and biased therefrom in a direction such that in use said feeler roller maintains contact with the edge of said panel throughout the operation of modification of at least part of the edge of the panel.

In a second aspect the present invention consists in an edging apparatus to perform an edge modification to an edge profile of a planar object, said apparatus comprising, a fixed structure to which a said object can be mounted, an edge follower movably mounted from said fixed structure and adapted to move along at least part of said edge profile of said object, a sensing means to determine the direction of travel, relative to a chosen frame of reference, of said following means as it is moved along said edge profile, an active biasing means acting between said fixed structure and said edge follower responsive to feedback from said sensing means to act on said edge follower to control the direction of bias of said edge follower towards said object, wherein said edge follower carries a driven rotatable means which engages with the edge of said object to thereby generate the movement of said edge follower along at least part of said profile, and a means to modify said edge of said object carried by said edge follower.

Preferably said biasing means acts to bias said edge follower with a direction component normal to the direction of movement.

Preferably there is also a small component of direction of said biasing means on said edge follower in a direction of movement of said edge follower along said edge profile.

Preferably a rotational force of said driven rotatable means provides a rolling action of said driven rotatable means to impart a displacement of said edge follower along said edge profile.

Preferably said driven rotatable means is separate from said means to modify said edge.

Preferably such separate driven rotatable means is engagable with said edge profile of said object and, relative to the direction of movement, is either advanced or trailing said edge modification means.

Preferably said apparatus is an edge tape application machine to apply tape to the edge of said object and includes a means to feed a tape material to said edge profile at the point where the following means is located at said edge profile, said application occurring at the means to modify said edge which is a pressure roller.

Preferably said means to feed is either passive or active in feeding the tape material.

Preferably said means to feed includes, prior to the tape reaching said pressure roller, a means to apply adhesive to the surface of said tape material to engage with said edge profile.

Preferably in addition said apparatus includes means to apply adhesive to said edge profile of said object prior to said tape being applied thereto.

Preferably said sensing means includes a means which in use has a two point contact with said edge proximate to the location of said edge follower to determine the angular orientation between said two points relative to said reference frame to thereby provide feedback to said biasing means of the angular orientation at or approximate to the point where the driven rotatable means is in contact with said edge profile, to thereby appropriately allow for control of the direction of bias of said biasing means to said following means.

In a further aspect the present invention consists in an apparatus for providing an edging material to the edge profile of an arbitrarily shaped planar object, said apparatus comprising or including:

a fixed structure to which said object can be mounted, an edge follower movably mounted from said fixed structure and adapted to move along at least part of said edge profile of said object, a sensing means to determine the direction of travel relative to a chosen frame of reference of said following means as it is moved along said edge profile, an active biasing means acting between said fixed structure and said edge follower responsive to feedback from said sensing means to act on said edge follower to control the direction of bias of said edge follower towards said object, wherein said edge follower carries a driven rotatable means which engages with the edge of said object to thereby generate the movement of said edge follower along at least part of said profile, whereby in use, the provision of an edging material to the edge profile of the arbitrarily shaped planar object occurs by it being fed between a pressure roller of said edge follower (whether it is also said driven rotatable means or other) and the edge profile of said following means providing a pressing force to said pressure roller onto the edging material to press it onto said edge profile.

In yet a further aspect the present invention is a method of edge banding an edge of a planar panel comprising mounting a panel on a support structure, placing a pressure roller adjacent an edge of said panel, and whilst providing a feed of edge banding material to engage with said panel and which is fed onto said panel between the pressure roller and said panel, providing a rotation to an at least one rotating edge contact roller (whether it is also acting as the pressure roller or not) which is in contact with the edge of said panel advancing said pressure roller and/or said edge contact roller along said edge and which simultaneously deposits the edge tape to the edge of said panel, and controlling the application of a vectored force application means to the edge contact roller, which is controlled in response to the angle of the panel at said edge contact roller to thereby press said edge contact roller against the edge of said panel.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples.

BRIEF DESCRIPTION OF THE DRAWINGS

One preferred form of the present invention will now be described with reference to the accompanying drawings in which.

DETAILED DESCRIPTION OF THE INVENTION

In the broadest sense the apparatus as herein described may provide a multipurpose means for modifying the edge of a substantially planar object. As hereinafter described any reference to the term "modification" is meant to include any one or more of the following; cutting, trimming, sanding and glueing, painting and deposition of edging. While particular emphasis is given to the capability of the tool in respect of applying edging to the edge profile of a planar object it should not be considered as being exclusively for this purpose.

Figure 13:
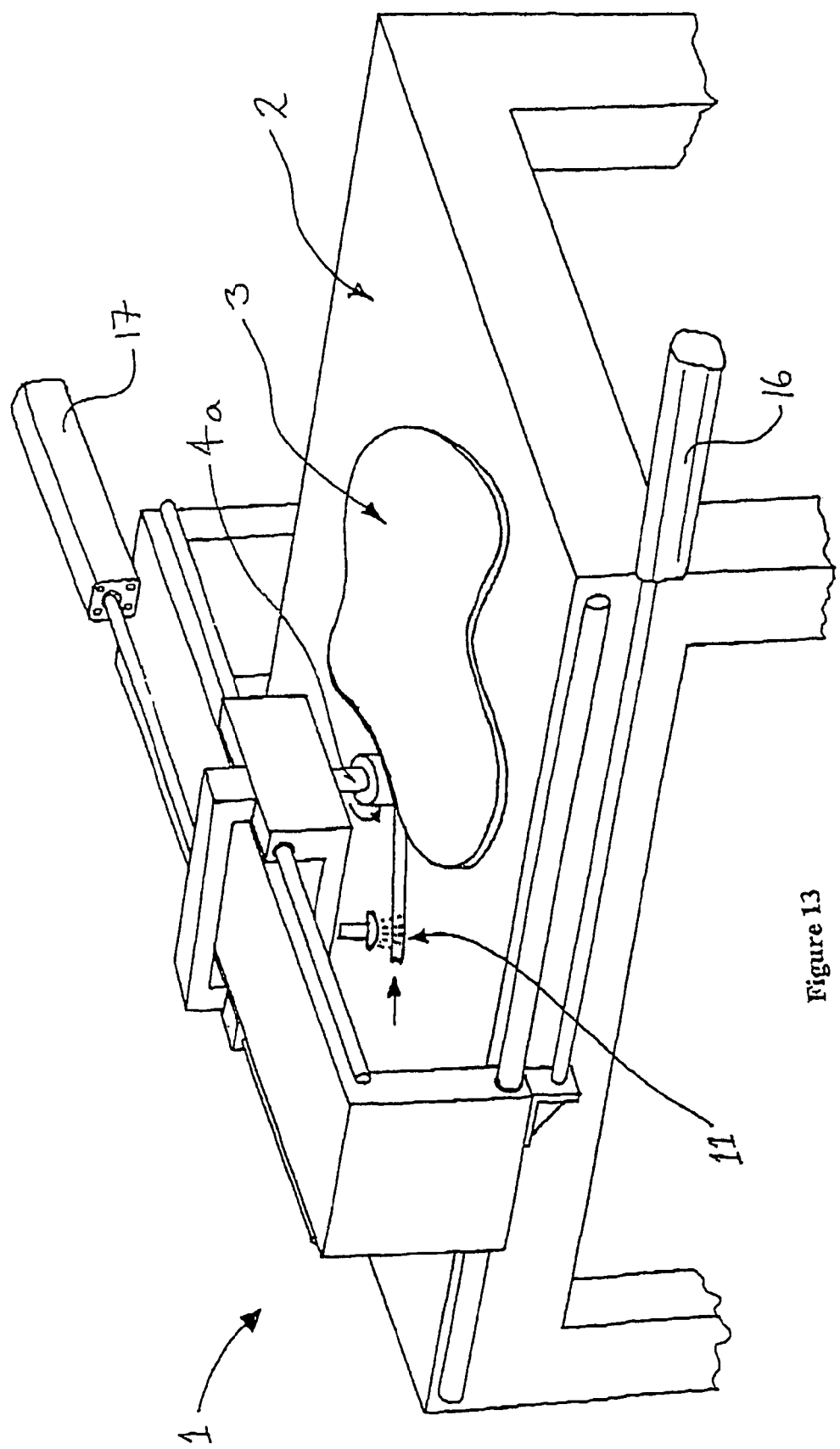
FIG. 13 shows the edging apparatus in its entirety, the apparatus showing a contoured planar object which is clamped to the bed of the apparatus, the apparatus comprising a translating means such as a gantry arrangement which carries the edge follower, the displacement of the gantry is biased by pneumatic actuators, constant torque servo motors or some similar contact pressure device, the overhead gantry in turn providing the necessary force for pressing the edge follower against the edge profile of the planar object, in this instance the edge modification involves the application of a tape supplied from the left as shown, and wherein a fixed frame of reference may be defined relative to the bed.
Figure 14:
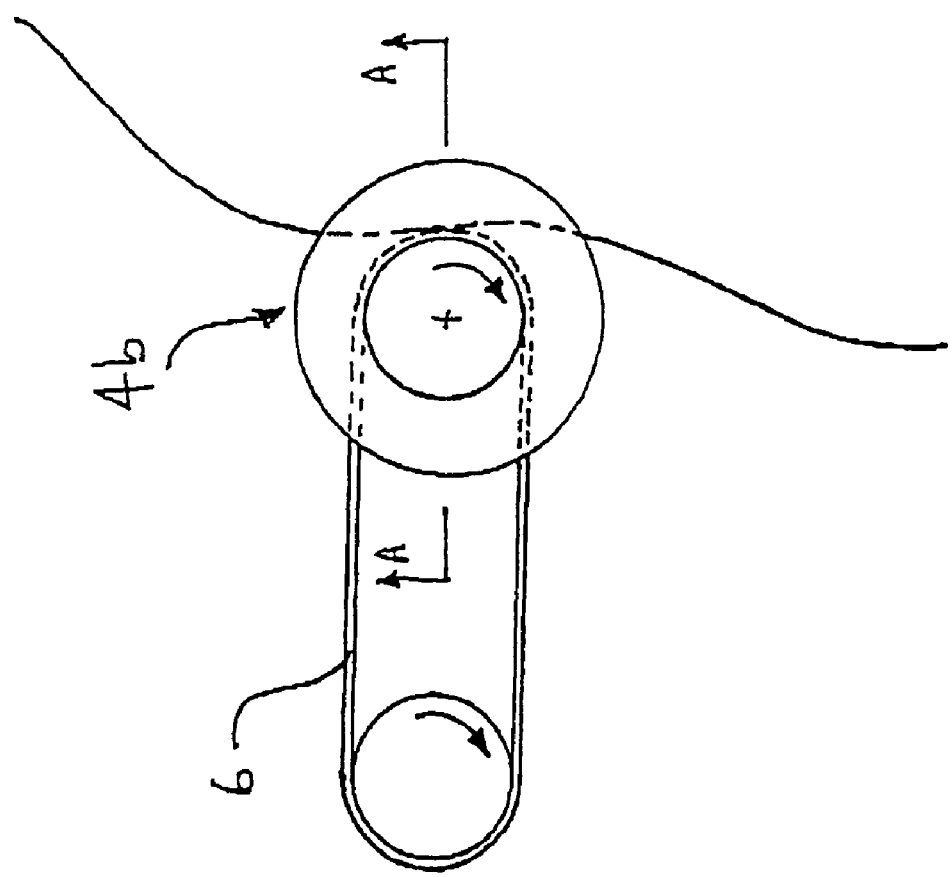
FIG. 14 shows in plan a diagrammatic view of an edge modification apparatus that accords with the present invention, the apparatus in this case being used for trimming or cutting the edge profile of the planar object, such a tool being driven by a driving means as with the cylindrical presser of FIGS. 11, 12 and 13.
Figure 15:
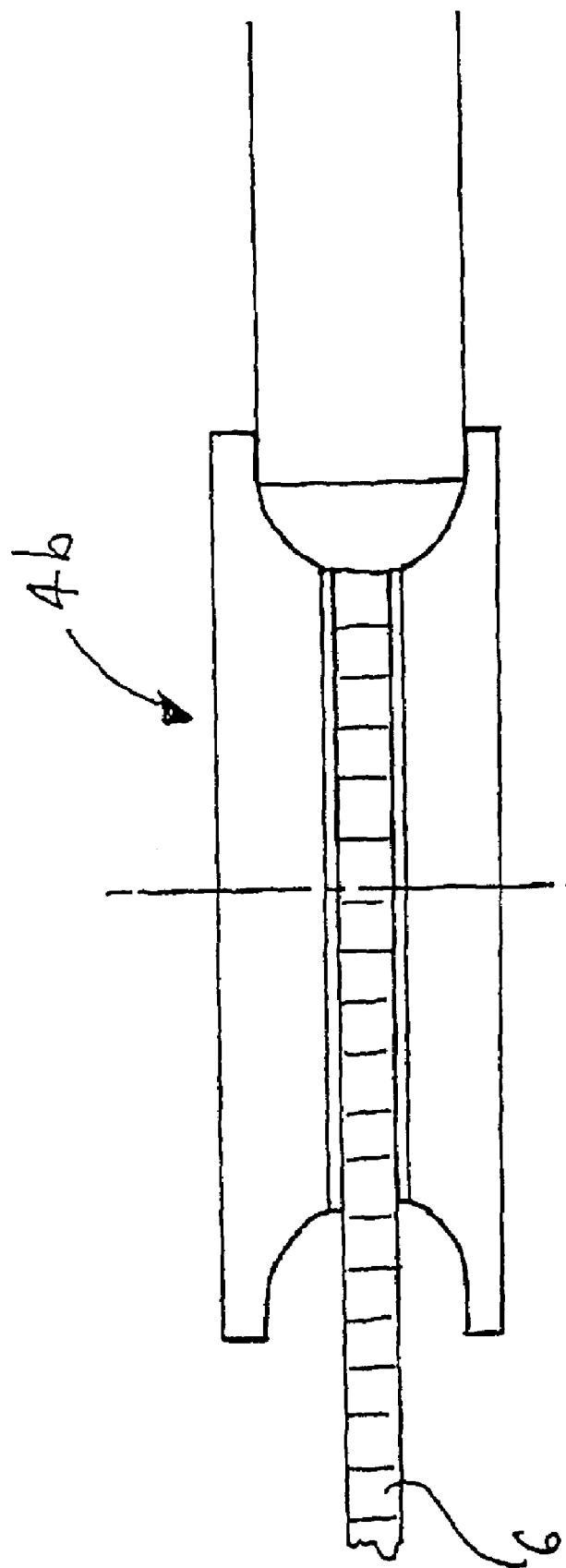
FIG. 15 shows a side view of the edge modification apparatus of FIG. 14, the planar object shown to the right being modified by the cutting action imparted by the profile of the driven tool, there also being shown a driving belt which provides the means to progress the tool.

In the most preffered form of the present invention, as shown in FIG. 13, the apparatus 1 includes a flatbed 2 onto which an arbitrarily shaped planar object 3 is placed and preferably clamped or fixed. The particular orientation of the planar object is unimportant since the apparatus 1 includes an adaptive capability so that it may perform any one of a number of modifying operations consistently around any arbitrarily shaped object. The flatbed 2 is however preferably expansive enough to accommodate a range of differently sized objects.

The mode of operation of the apparatus 1 involves the movement of the edge follower which includes at least one contact roller to be pressed against the edge. Such a contact roller as for example denoted by 4a and 4b can travel around at least part of and preferably the entire perimeter or edge profile 5 of the planar object 3. The following member might take any one of a number of forms and provide at least one contact roller free to rotate of its own accord or preferably driven by a servo motor or by a drive mechanism which may include a driving belt 6, as shown in FIGS. 12 through 15.

Figure 11:
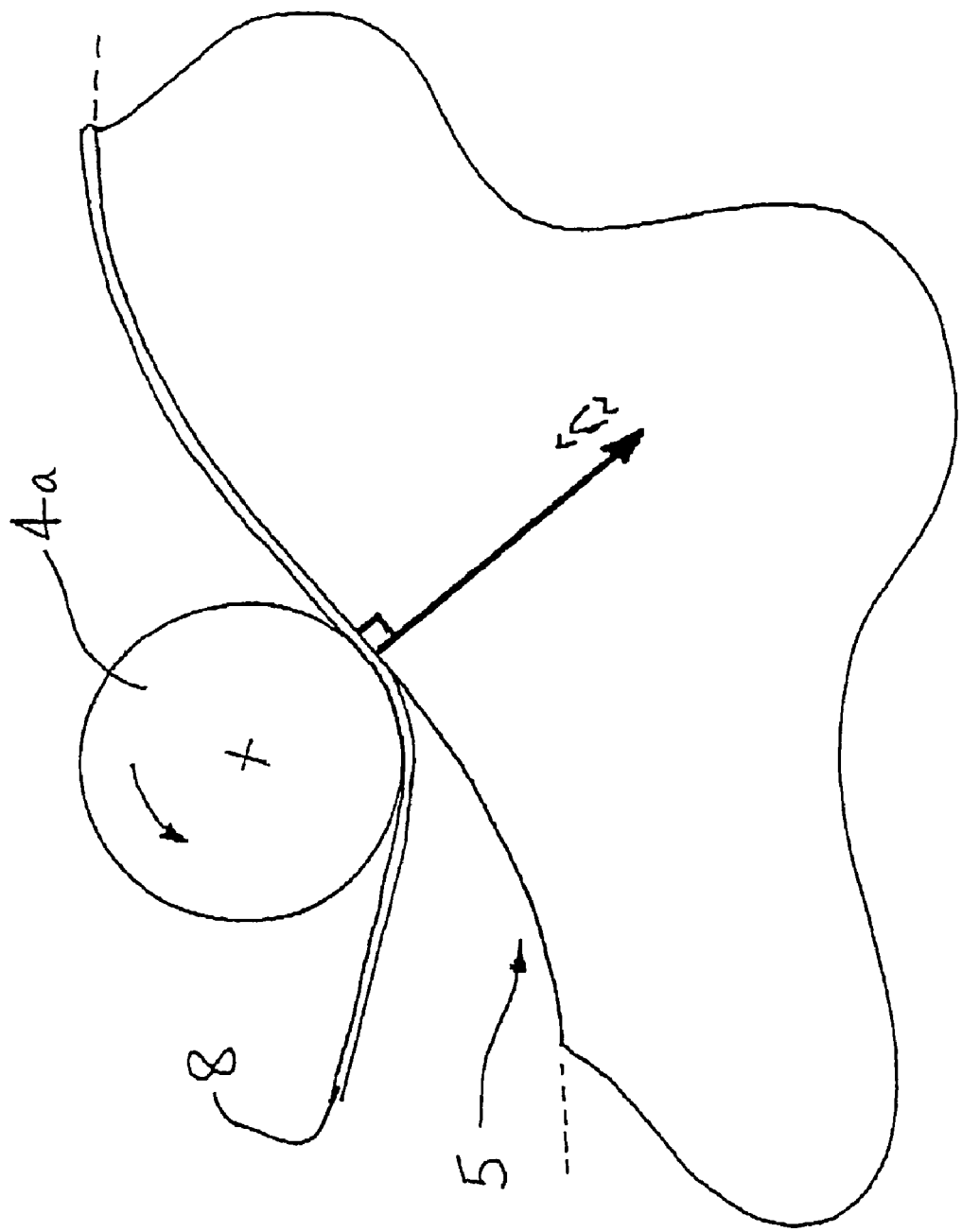
FIG. 11 shows in plan a diagrammatic view of the edging application in which the edge follower with a circular presser head, is rotatably driven as it is moved along the edge profile of the planar object, the edge follower applying a force in the direction of the surface normal detonated by "n"
Figure 12:
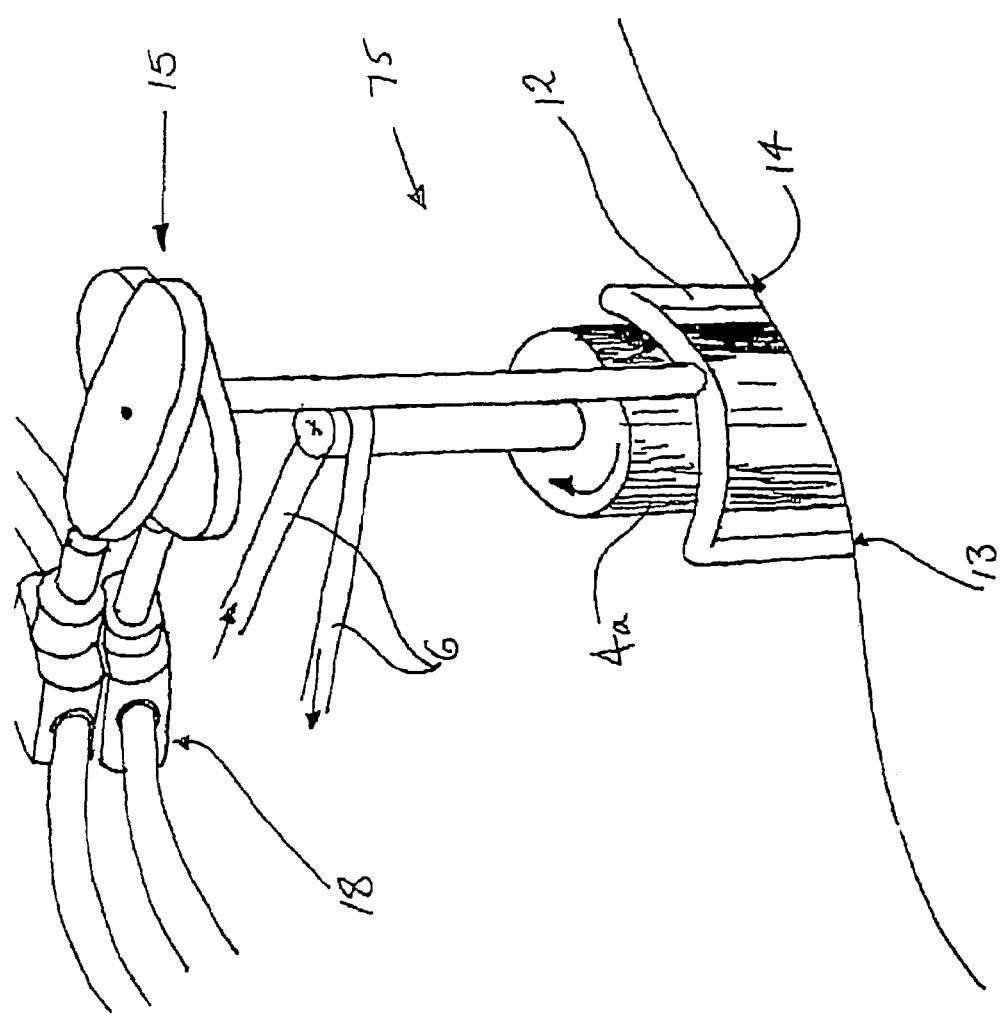
FIG. 12 shows in perspective a view of the edge follower generally denoted by 75, the sensing means being in contact with the edge profile of the planar object at two points immediately preceding and following the circular presser head, the sensing means as shown being in direct communication with a camming arrangement shown above which in turn regulates the biasing means (not shown)

The form of the edge following member is dependent on the intended operation being performed over the edge profile. For instance as shown in FIGS. 11, 12, and 13 where it is intended to apply an edging around the edge profile of the object, the edge follower provides a contact roller in the form of a rotatably driven cylindrical member. By contrast, where a cutting or trimming operation is required, the roller may be of the kind shown in FIGS. 14 and 15 or a separate cutting tool may be provided disposed from the edge follower.

Figure 1:
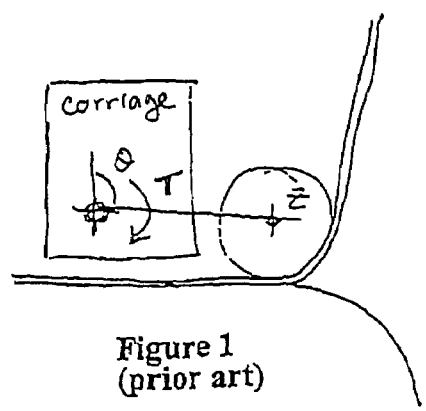
FIG. 1 is a prior art representative illustration of the roller features wherein the NC position controlled carriage provides a pressure roller located on an arm to which a torque is applied to press the tape to the edge of the object and wherein the angle between the arm and the carriage is utilised to provide feedback to control the X and Y axis speed components of the carriage. The positioning of the carriage is outside of the edge of the object and is determined and achieved by the NC. The X and Y control of speed does not provide the pressure to the edge and this is achieved by a constant torque device acting on the arm.
Figure 5:
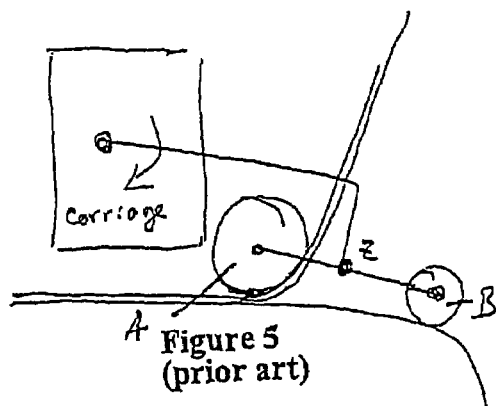
FIG. 5 is a prior art representative illustration of the roller features of DE3517194 which has the arrangement of sensing the angle between two rollers, one a pressure and the other a sensing roller which are both disposed from the arm to which a constant torque means of said carriage can act, and a constant torque device as in FIG. 1 provides the bias onto the pressure roller system.
Figure 2:
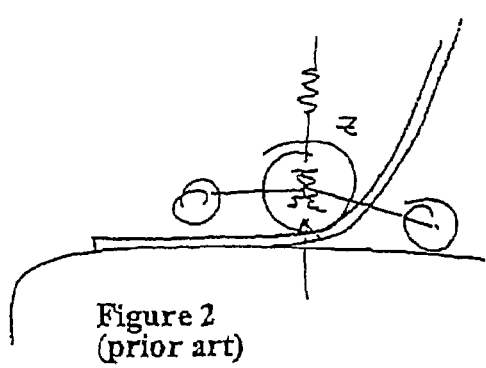
FIG. 2 is a prior art representative illustration of the roller features of DE3517194 wherein the principle of operation is similar to that of FIG. 1 but where the angle and hence the velocity of travel of the carriage is determined by the advance and trailing sensors. A linear biasing means such as a spring is then used to take up any error to bias the pressure roller onto the edge of the object.
Figure 3:
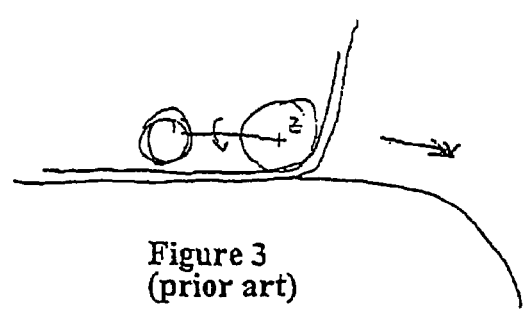
FIG. 3 is a prior art representative illustration of the roller features of DE3914461 wherein the pressure bias on Z is applied by a CNC controller to position the device proximate to the panel and wherein the remainder of any variation is taken up by a spring.
Figure 6:
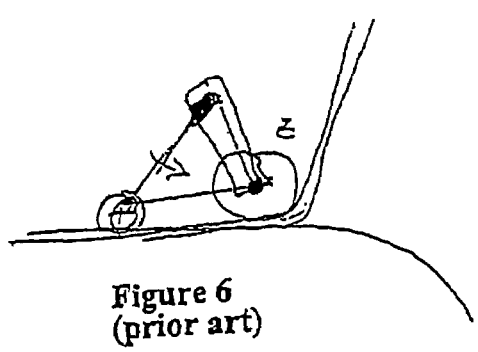
FIG. 6 is a representative illustration of the roller features of EP0728561 and is a variation of FIG. 3 and is CNC controlled.
Figure 4:
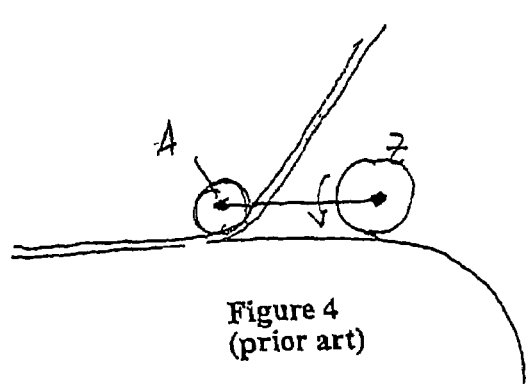
FIG. 4 is a prior art representative illustration of the roller features of EP945235 and is a variation on that shown in FIG. 3. The system is controlled by a CNC with the Z axis being the pivot and also the glue applicator roller. The pressure on the roller A is applied via a constant torque device about Z.
Figure 7:
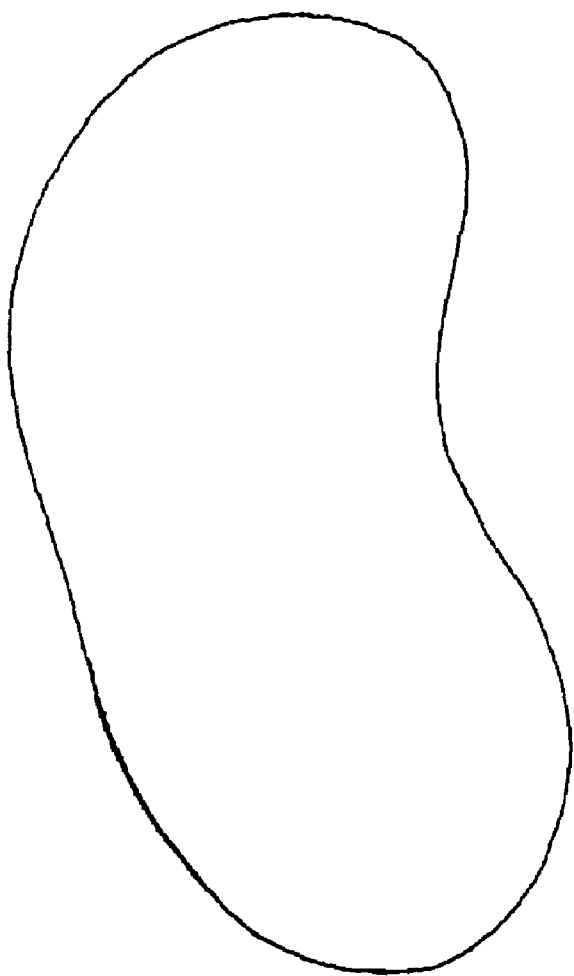
FIG. 7 is a plan view of a substantially planar object, the object being contoured in such a way that might function as a table top or the like, and FIG. 8 shows a side elevation of the planar object of FIG. 7, the object being of constant thickness throughout.
Figure 8:

The apparatus 1 is preferably intended for the edge modification of planar objects that possess continuity of slope over the entire edge profile (ie. no sharp corners or geometric discontinuities). An example of such an object is shown in FIGS. 7 and 8. It is however also within the scope of the present invention to modify objects possessing sharply changing edge profiles.

Figure 10:
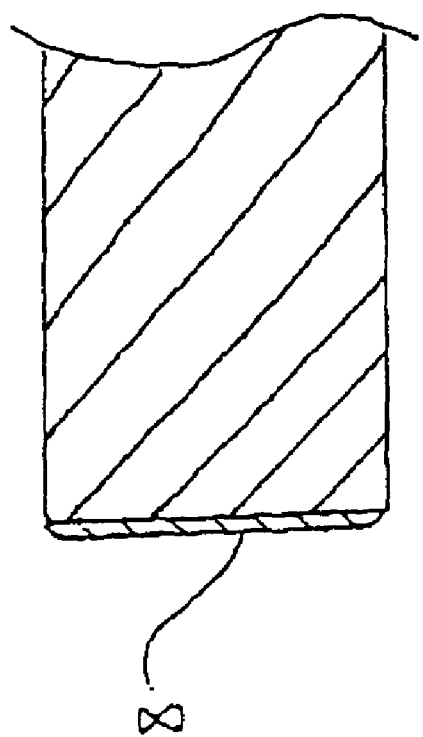
FIG. 10 shows a similar part section view to that shown in FIG. 9, the edging in this case being of a strip or veneer variety adhesively affixed to the edge of the planar object.
Figure 9:
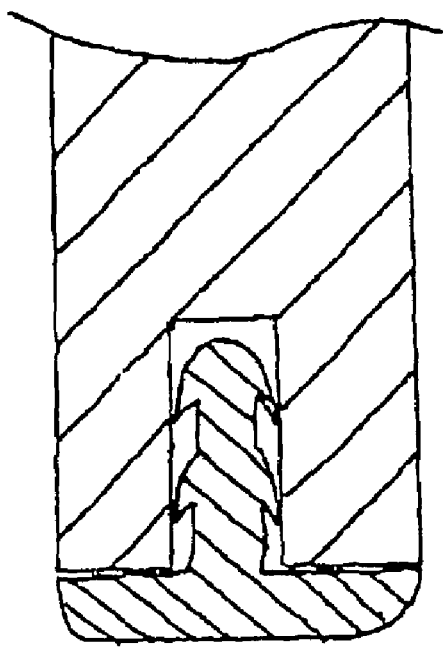
FIG. 9 shows a part section view of an outer edge of a planar object on to which an edging has been applied, in this instance the edging being of a variety that penetrates the edge of the table and being retained by barbs provided for on the penetrating portion of the edging.

With reference to FIGS. 9 and 10, the form of the edging may take any one of a number of configurations. They are not however exhaustive of the types that might be used in practice. The edging 8 shown in FIG. 10 is of the strip variety which is adhered to the edge profile with an adhesive 11 applied to either the tape or the edge profile prior to application.

With reference to FIG. 11, the edging 8 is preferably supplied from a spool located away from the pressure roller which is to press the tape to the edge of the panel and is able to be supplied at a constant rate equal to the speed at which the contact roller 4a is driven around the edge profile of the object. In some instances it is desirable for the edging 8 to be supplied with a degree of back tension to avoid any build up of slack that may result in the process becoming unstable. In the form of the invention shown in FIG. 11, the edging being supplied from the left of the object is subject to the application of adhesive 11 on the object contact side of the edging. The adhesive 11 is preferably an EVA or rapid cure epoxy-type adhesive but might be any appropriate glue or adhesive.

With reference to FIG. 11, the contact roller also acts as the pressure roller 4a and applies a normal force to the edge profile during the application of the edging, the force being in the direction of the surface normal shown as "n". As shown in FIG. 12, the angle of the edge profile is sensed by a sensing means 12, which determines the angle of orientation of the edge in relation to a predetermined frame of reference (eg. an x-y Cartesian coordinate system). In one form the sensing means 12 may be a member as shown in FIG. 12 which is in contact with the edge profile of the object at two points immediately forward and aft of the contact roller, the contact points denoted by 13 and 14 respectively. In the particular arrangement shown in FIG. 12, the angular position of the sensing means 12 is critical to feed back such information to control force application means which act on the roller (directly or not) to provide a resultant force which does not contribute to any movement of the edge follower along the edge, and where for example one edge roller is provided at which the angle of the panel is sensed proximate thereto and to which the force application means are provided to act, the force is provided substantially normal to the edge of the panel at which such a roller is provided.

The present invention also envisages variants of the sensing means 12 shown in FIG. 12 whereby any change in the slope of the edge profile might be sensed either mechanically, as in FIG. 12, or electronically by some non-contact means that might include imaging or scanning the edge profile of the object such as real time optical shape recognition. Any such sensing means forms part of a control system with the objective being to sense the slope of the edge profile and thereby initiate an adaptive response in terms of a force application means which applies some force to the edge profile resultants substantially in direction "n". Possible systems for sensing the angle of the sensing means that fall within the scope of the present invention include electronic control systems such as PLC, or mechanical linkages and camming arrangements similar to the one depicted in FIG. 12.

Figure 24:
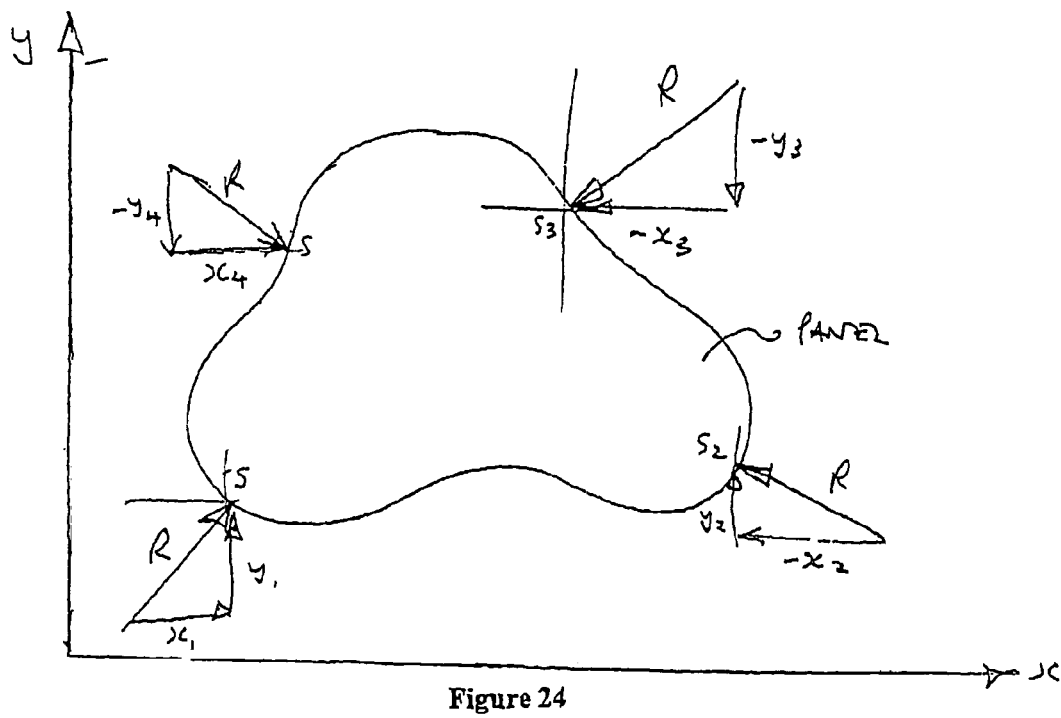
FIG. 24 illustrates the force vectors in a Cartesian sense where $s_n$ is the sensor point at n, $x_n$ is the x axis applied force at point n, $y_n$ is the y axis applied force at point n and R is the result in force, and wherein the forces in direction X and Y are varied by feed back from the sensor to keep the magnitude of R essentially constant.
Figure 25:
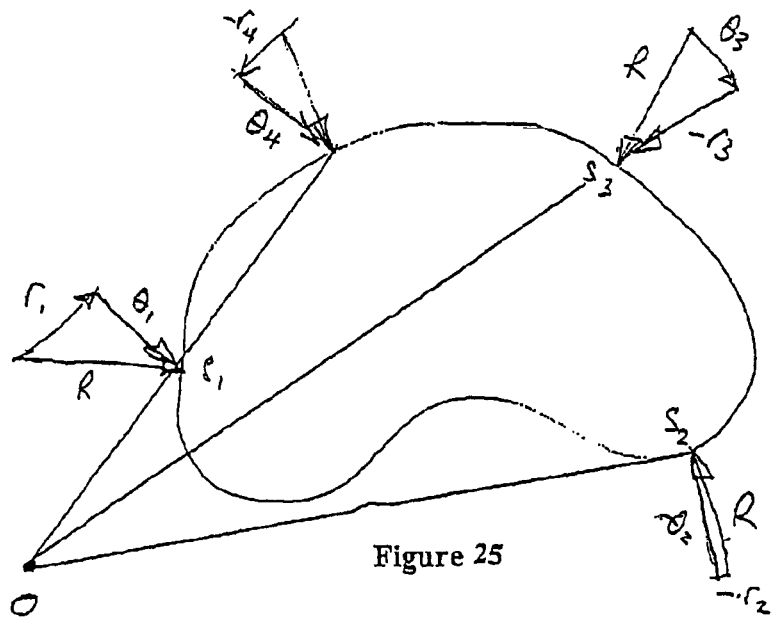
FIG. 25 is an illustration of the forces applied in a polar coordinate system where $r_n$ is the radial force and $\emptyset_n$ is the tangential force applied in respect of point O, to the object.

With reference to FIGS. 24 or 25, the configuration of the apparatus is such as to provide a normal force by the edge follower to the contact roller(s) against the edge of the panel at which they are in contact in a manner so that the edge modification means of the present invention can suitably modify the edge of the object. In one form the edge follower is that which provides the modification by way of for example applying pressure to a tape to be adhered to the edge of the panel. The edge modification means may itself be disposed from the edge follower to which the force application means provide the resultant force in a substantial normal direction to the edge of the panel at the point at which it is in contact or the edge roller and the edge modification means may be one and the same item. A driven roller which is preferable the contact roller but may otherwise or in addition be a separate roller (which may also be the edge modification means), is rotatably driven to displace itself and hence the edge follower along the edge of the panel. The driven roller itself is preferably in contact with the edge of the panel and as a result of friction, is able to displace along the edge of the panel. The normal force applied to the edge follower can be applied through an x, y coordinate frame or a polar coordinate frame or a hybrid of both. The edge follower may provide more than one edge contact roller and at least one and perhaps all of such edge contact rollers may be provided to be driven. Indeed any one or more edge contact roller (whether driven or not, and whether or not the position of any such roller is taken into consideration by the edge sensor and thereby applying a force to such a roller) may be utilized as an edge modification roller such as for example a pressure roller for pressing the edge tape to the edge of the panel, a glue application roller for gluing the edge of the panel in advance of the tape being pressed thereto or other.

Figure 32:
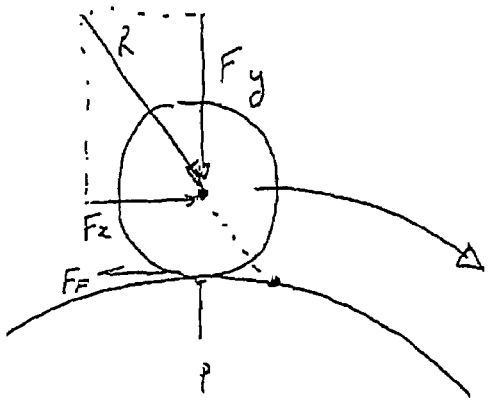
FIG. 32 illustrates how the resultant force of the vectored forces may be applied in a direction which may be slightly in advance of the normal of the edge of the object at which the follower is provided.

It is envisaged that the force application means will deliver the resultant force R to the edge follower at an angle substantially through its center of rotation Z, in line with the point of contact p of the follower with the edge of the panel. In case there is any misalignment by the pressure application means to provide a resultant force in a direction not normal to the surface at the point of contact of the edge follower with the edge of the panel, as for example shown in FIG. 32 the frictional force $F_F$ between the edge of the object and the follower can be sufficient to prevent the follower from traveling undesirably. Indeed the direction of application of the resultant force may be specifically directed to provide a slight net force transverse to the normal of the edge of the panel at which the edge follower is in contact in a direction of travel of the follower as for example shown in FIG. 32.

In use the invention shown in FIG. 13, provides the planar object 3 clamped to the bed 2 of the apparatus 1. The following means is then moved into contact with the edge profile of the object 3. Once the following means is in position, the apparatus 1 is started by an operator. As the contact roller 4a moves in relation to the edge profile, the sensing means 12 senses the slope of the edge and, in real-time, initiates adjustment of the pressure being supplied to the pneumatic actuators 16 and 17 which control, in combination, the resultant force acting on the edging 8 as it is applied to the edge profile 5. In the form of the invention shown in FIG. 13, the control of the pneumatic actuators 16 and 17 is via a camming arrangement 15 of the type depicted in FIG. 12. Such a camming arrangement acts on an arrangement of regulators 18 which regulate the pressure to the pneumatic actuators (or alternatively servo motors) 16 and 17 shown in FIG. 13.

It will be appreciated that alternatively to the pneumatic actuators, a rack and pinion type arrangement could be used where such rack and pinion chain or belt drive arrangements may be driven by for example variable torque servo motors.

In a polar coordinate arrangement, an arm may be provided to be pivotable about for example a point O as shown in FIG. 25, wherein the edge follower is mounted on the arm and wherein its linear displacement may be achieved along the arm by a rack and pinion or hydraulic arrangement able to provide variable force in a radial direction. The arm itself may be rotated about point O by a motor or by a hydraulic ram which also is able to provide a variable force (i.e. moment) about point O to the arm. By employing a sensor which can determine the direction of the normal at or approximate to the point at which the edge follower is positioned on the edge of the panel, a feed back of the sensor to the mechanism for controlling the application of the force whether in the x, y coordinate frame or polar coordinate frame, will allow for the resultant force to be varied in direction by varying the magnitude of the forces in each frame of reference. In operation the magnitude of the resultant force is preferably kept constant and at a magnitude suitable for the particular application to which the edge modification means of the device is being used.

Figure 26:
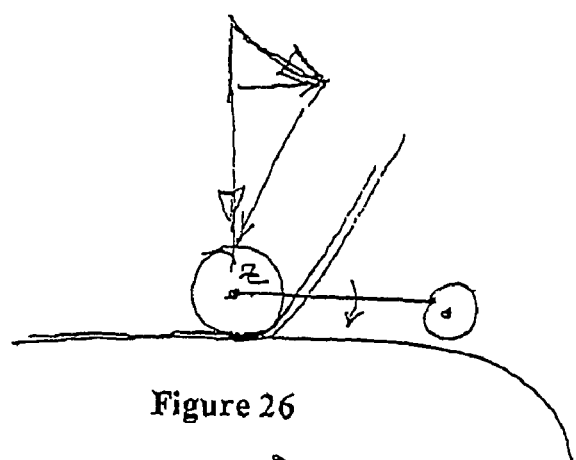
FIG. 26 illustrates the edge follower to which a Cartesian coordinate force application may be provided and wherein the sensing means consists of a feeler roller which is mounted relative to the edge follower in a rotational relationship and is pivotable in a biased manner and such that torque may be applied by a pneumatic cylinder, rack and pinion or drive chain appropriately located between a carriage and the arm between the carriage and the advanced roller as shown in FIG. 26.
Figure 27:
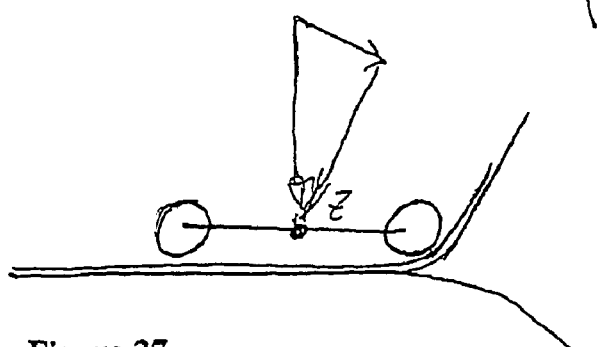
FIG. 27 illustrates an alternative arrangement of the present invention wherein two edge rollers are provided on a carriage and wherein the forces by the force application means are provided at some point on the carriage to thereby basis both feeler rollers to the edge of the panel. In this arrangement the force from the force application means may not be in a direction which is normal to the points at which the rollers contact the edge. However the combined net force interacting between the object and the two rollers will be such as to keep the arrangement stationary (where no drive is provided to the rollers).
Figure 28:
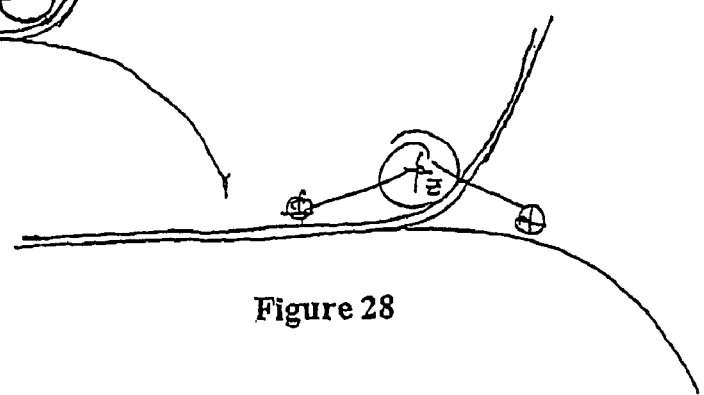
FIG. 28 illustrates two sensing means for determining the slope of the surface relative to the coordinate system wherein for example one may be utilised to provide feedback of the slope of the surface to the force application means and the other may be utilised for providing feedback to ensure that the carriage (if any) may be appropriately orientated relative to the edge of the panel.
Figure 29:
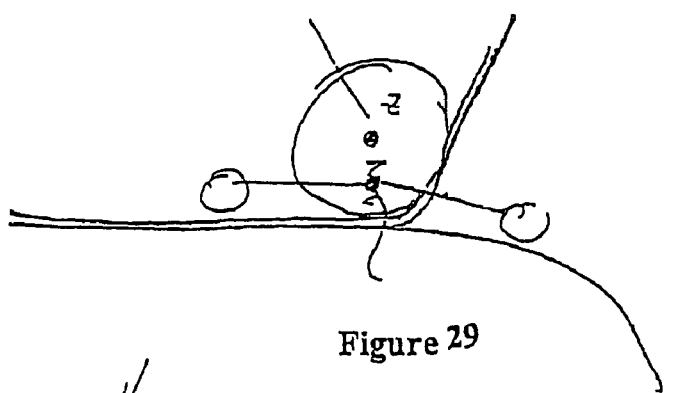
FIG. 29 illustrates the angle sensing pivot need not be concentric with the axis of rotation of the edge follower.
Figure 30:
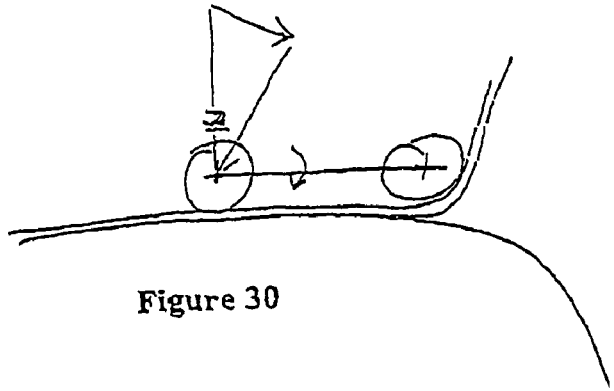
FIG. 30 illustrates that the edge contact rollers which is biased towards the edge of the panel as a result of the force application means need not be that which also provides the edge modification to the edge of the panel, and in FIG. 30 the edge modification means is shown in advance of the edge contact rollers and may be rotationally displaced therefrom via an arm linkage which itself may be biased by for example a constant torque servo, pneumatic cylinder or rack and pinion or drive chain arrangement from the carriage carrying the edge follower.
Figure 31:
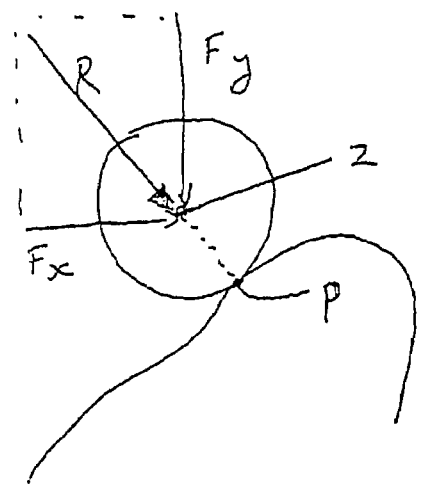
FIG. 31 illustrates an edge follower to which the vectored forces are applied.

FIGS. 26 and 30 illustrate alternative arrangements and relationships between the edge follower and/or sensing means of the present invention. Their basic operation has previously been discussed. However, FIG. 27 is now further discussed with reference to FIGS. 36 and 37.

Figure 36:
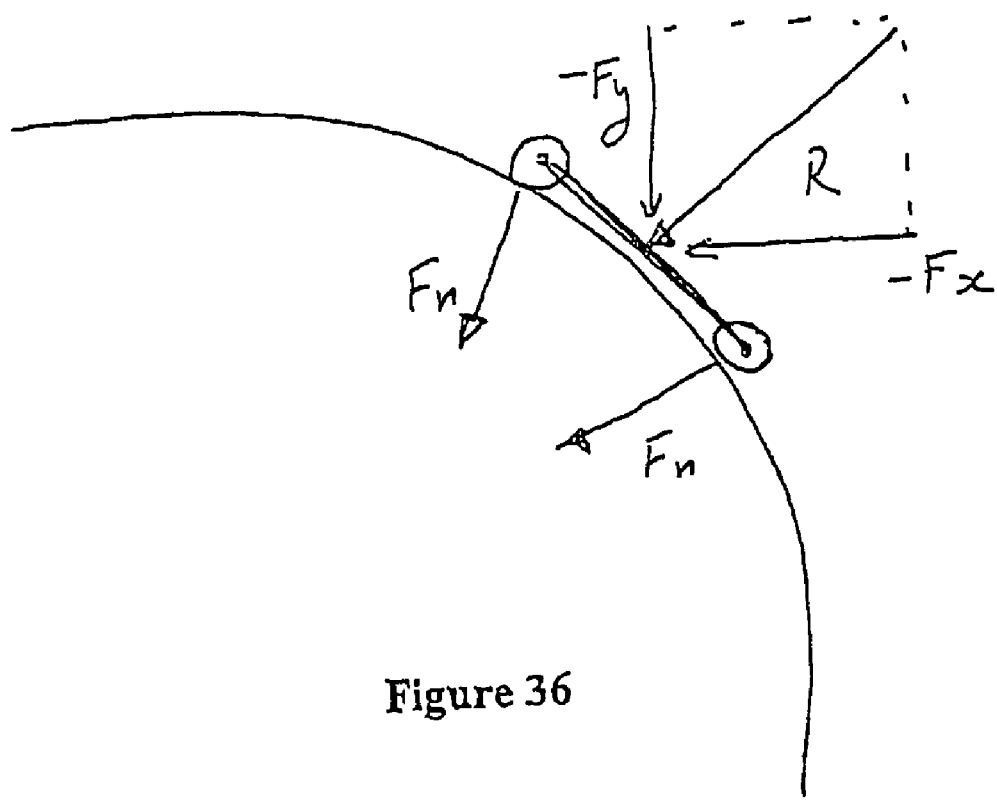
FIG. 36 illustrates an edge follower which includes two rollers, one trailing and one advanced roller engaged to each other via a linkage and wherein the vectored forces are applied in a manner such that when no drive is provided to either of or another of the rollers, the carriage will not displace along the edge, and preferably essentially normal.
Figure 37:
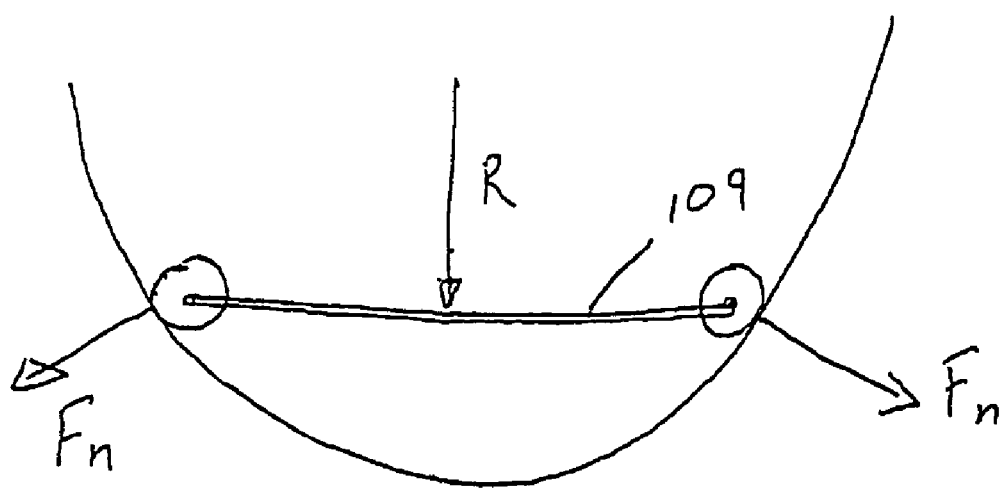
FIG. 37 is of an arrangement as shown in FIG. 36 and wherein the edge follower is traveling along a concave section of an edge of the object.
Figure 38:
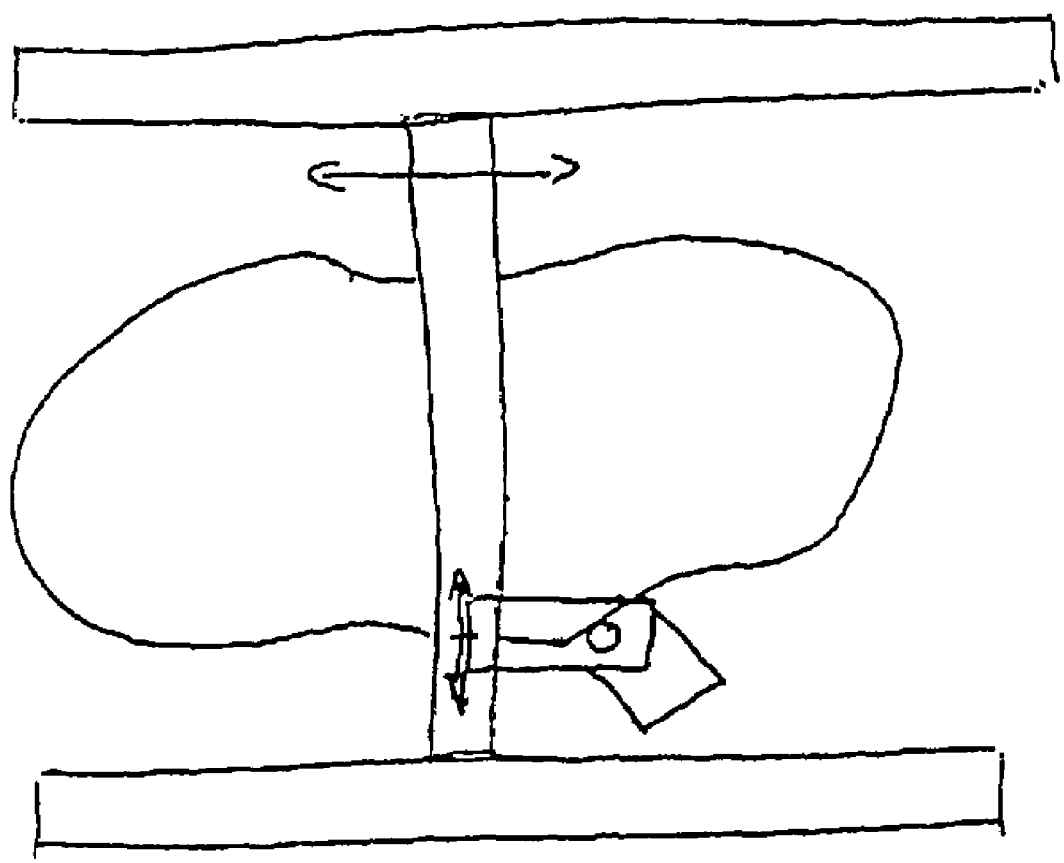
FIG. 38 is a plane view of the cartesian set up of the present invention as for example shown in FIGS. 34 and 35 wherein the carriage has been rotated to be appropriately positioned relative to the edge of the object.

With reference to FIGS. 36 and 37, it can be seen that the edge follower to which the resultant force is applied may include more than one edge contact rollers wherein one is a leading roller and one is a trailing roller and which may be connected by some form of connection member 109. The resultant force may act at some point on the connection member 109 and with reference to the drawings it can be seen that the force R need not be in the direction normal to the edge at which each of the roller contacts the object. The force R here is in a direction wherein the force applied by each of the rollers at its point of contact on the edge is in a normal direction such as shown by $F_n$ in effect the force that is applied by R is such that essentially no net force is being applied to the at least one roller in a direction transverse to the normal at the point of contact of the roller(s).

Figure 16:
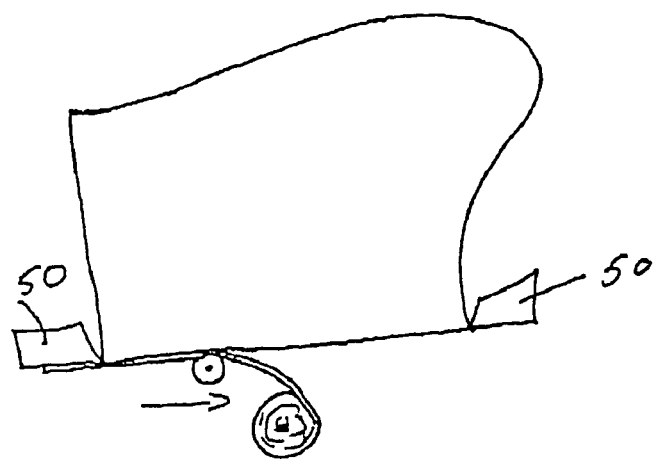
FIG. 16 is a plan view of a planar object wherein shown in association therewith there are termination elements or stops provided where the provision of the edging to the edge of the panel is to be terminated.
Figure 17:
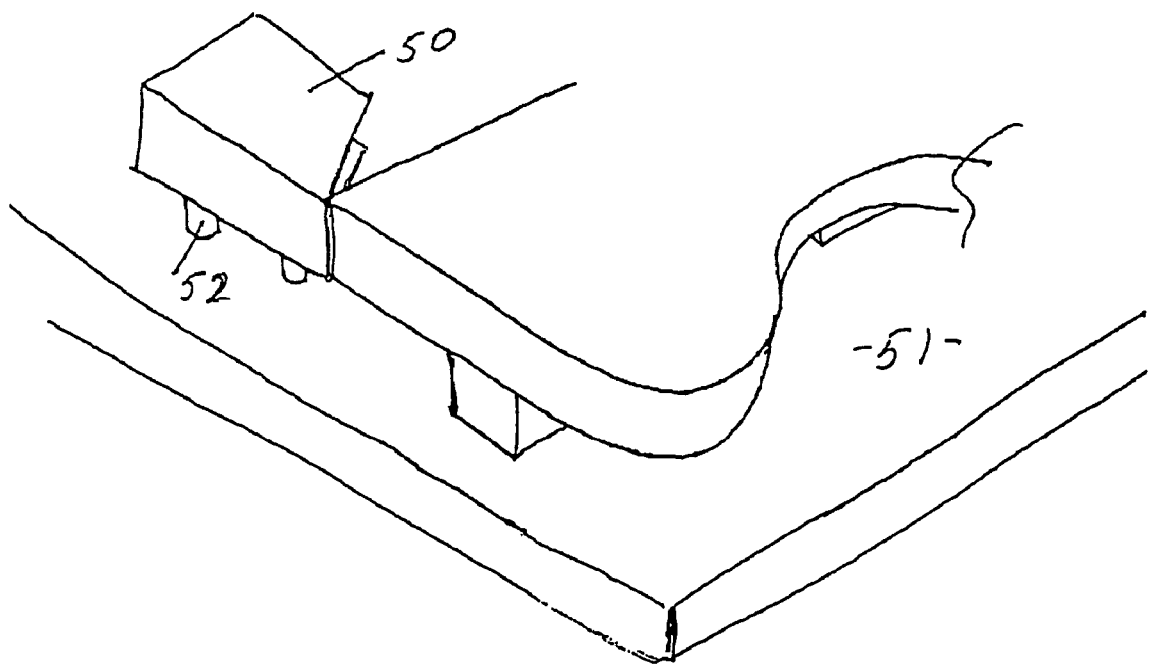
FIG. 17 is a perspective view showing the stop in location relative to the panel and also showing it located relative to a mounting table.
Figure 18:
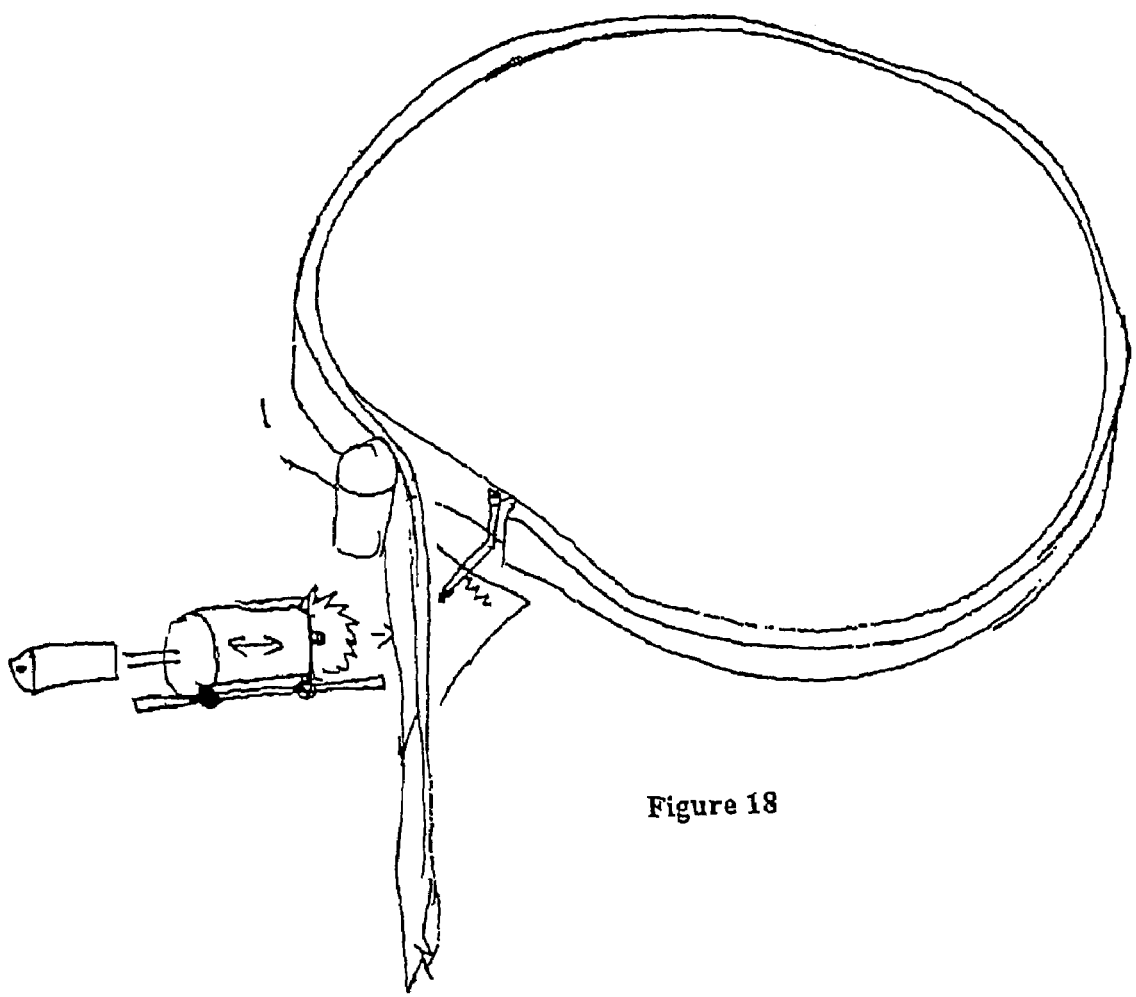
FIG. 18 is a perspective view illustrating how there may be provided a trimming means such as a trimming saw.

In order to assist in the initiation and termination of the provision of the strip material to the edge of a panel, stop devices may be provided as part of the machinery of the present invention. With reference to FIG. 16, such stop devices are to be placed in respect of the panel, in regions of the edge where the strip material is to be terminated. Such stop devices 50 may for example be steel plates or the like and may for example be positioned at the end of runs of the strip material where the strip material reaches for example a sharp corner of the panel. As it is undesirable for the strip material to be provided to run continuously around a sharp corner, such stops will provide a run on and run off of excess strip material beyond such corners as for example shown in FIG. 16. The stops are also provided for the benefit of initiating a run of the strip material along an edge. The pressure roller can start laying the strip material into a surface of the stop, thereafter allowing it to run onto the edge of the panel. In the form of the invention where stops are provided, the surface of the stop where the strip material may be applied, preferably has a surface which will allow for simple release of the strip material where this may be adhered to the stop. Where the panel to be worked on is provided on a work table, the work table preferably also has provisions to allow for the location of stops with the table in such a manner as to allow for the stops to be suitably positioned where needed or desired in relation to the panel. For example with reference to FIG. 17 the table 51 may have apertures there through, through which feet 52 of the stops 50 can be mounted. Alternatively or in addition, the table may provide a vacuum feature to allow for the vacuum location of both stops and/or vacuum supports for the panel.

Figure 19:
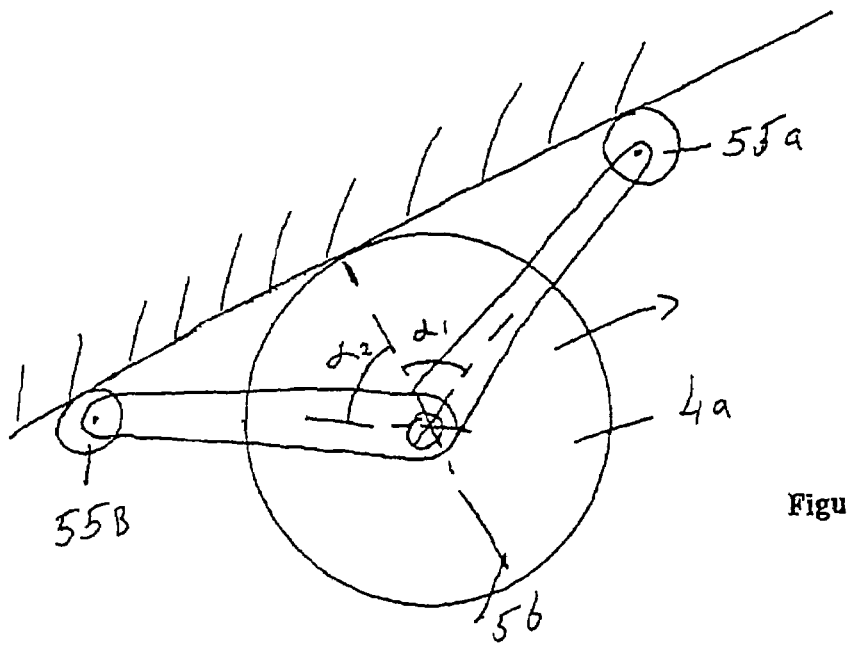
FIGS. 19–21 illustrate the provision of a further sensing arrangement to sense the curvature of the surface of the edge of the planar object in the region proximate to the following means.

It is envisaged that the machine of the present invention will require speed adjustment for certain shapes of panels. In certain situations, where a rapid change in curvature exists in the edge of the panel, the application speed of the strip material through such a region may need to be reduced. To this extent a sensing device of the invention will need to be able to determine the change of attitude of the edge at the point of the pressure roller. With reference to FIG. 19 the roller 4a may preferably also carry two feelers 55a and 55b at locations preferably advanced of and trailing the roller 4a. These feelers may for example be supported from the pressure roller by arms whose relative angular displacement to a norm line 56 ($\alpha_1$ and $\alpha_2$) when the main pressure roller 4a is moving will allow for the change of curvature to be determined. With reference to FIG. 19 where the roller is traveling along a straight surface, there will be no change in $\alpha_1$ and $\alpha_2$. As the roller approaches a concave corner as for example shown in FIG. 20, angle $\alpha_1$ increases relative to angle $\alpha_2$, for convex corners, of $\alpha_1$ would decrease relative of $\alpha_2$.

Figure 21:
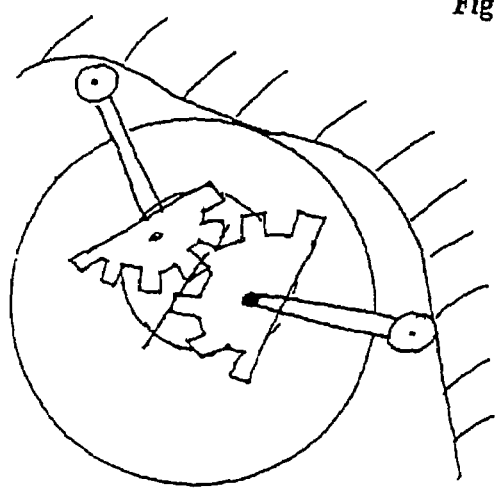

With reference to FIG. 21, a cog connection may exist between the feelers. In this arrangement the angles $\alpha_1$ and $\alpha_2$ will remain the same and it will be the orientation of the norm line 56 which will change relative to the edge of the panel.

Figure 20:
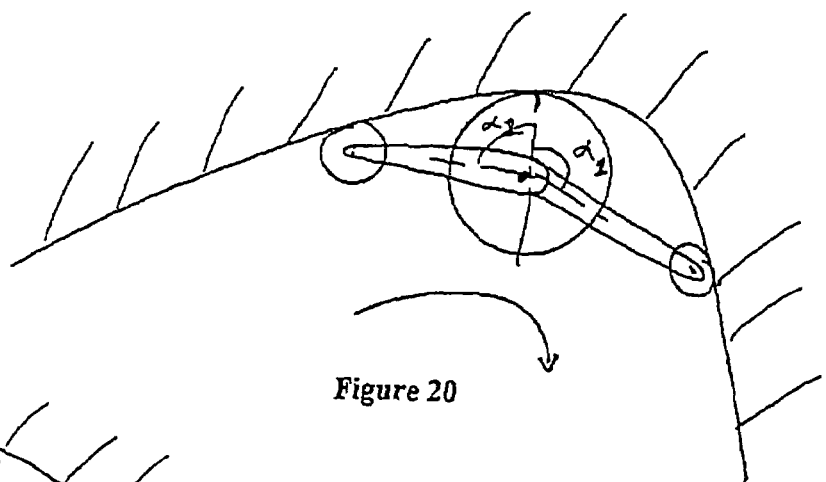
Figure 22:
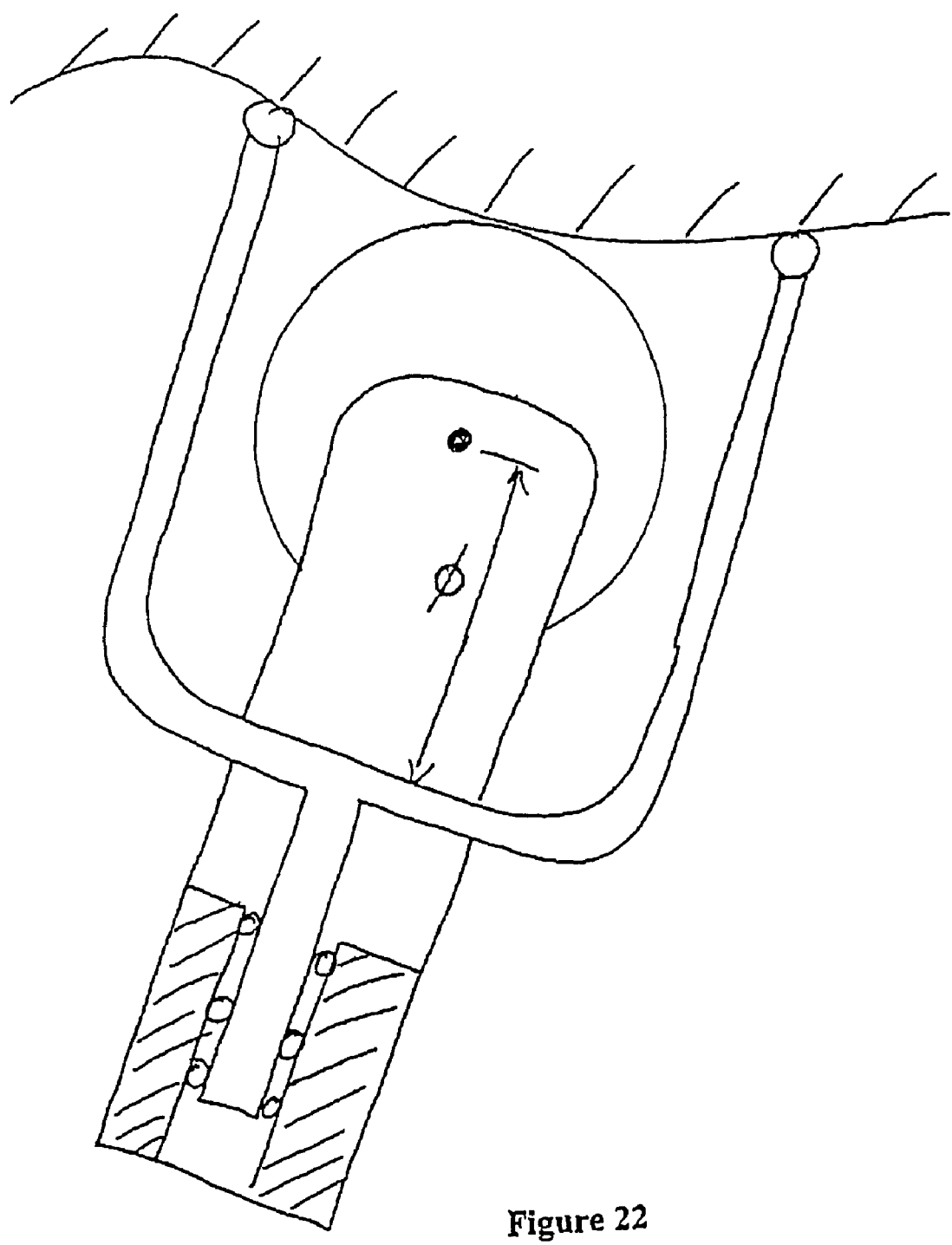
FIG. 22 illustrates an alternative arrangement to that of the arrangements of FIGS. 19–21.

FIG. 22 illustrates an alternative version to the rotational arrangement of the feelers as shown in FIGS. 19–21. In FIG. 22 there is provided feelers ahead of and trailing the pressure roller and wherein the distance Ø between a reference point on the roller (preferably the center of the roller) and a reference point on the arm changes is dependent on the curvature of the edge of the panel. The feelers may for example be mounted relative to the same mount of the roller but where the arms of the feelers are able to move backwards and forwards in for example a roller track.

Figure 23:
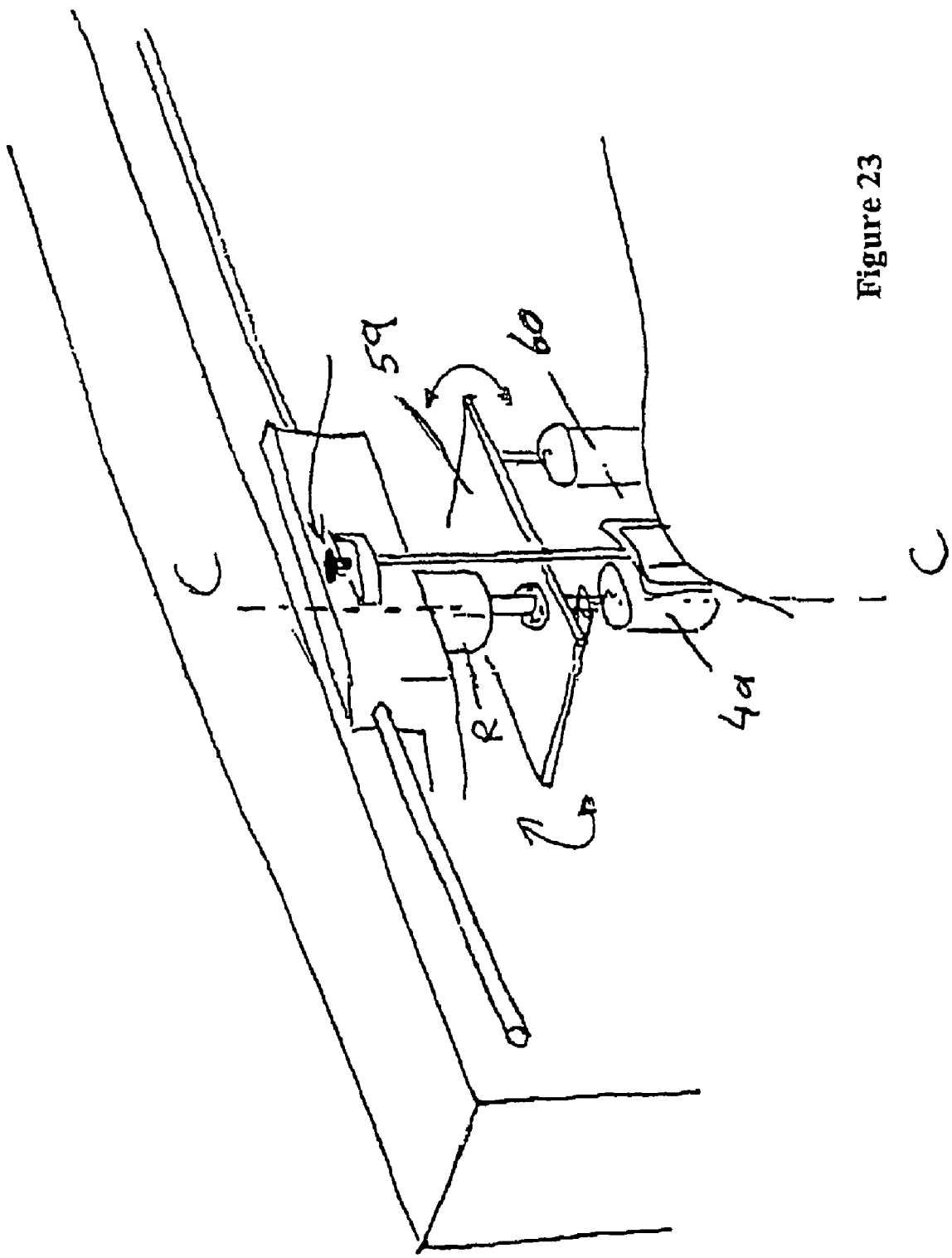
FIG. 23 shows the provision of the components of the present invention located on a mounting plate rotatable dependent on feed back from the angle sensing device.

With reference to FIG. 23 it is possible that the pressure roller 49 is mounted in conjunction with a mounting body or plate 59 which can rotate for example about an axis C—C by rotation mean R. This mounting plate can also carry at least one trailing roller 60. In this arrangement like the arrangement drawn in FIG. 33, a contact roller provided to keep the carriage in a particular relationship relative to the edge of the panel may simultaneously also be provided as part of the angle sensing arrangement of the present invention. For example in the polar coordinate arrangement, the angle sensing arrangement may be provided by a device which can detect the angle between O-Z-60. In a cartesian coordinate frame such an angle may be measured as a slope on an X-Y frame of reference.

Feedback from the angle sensing device can hence allow for it to be kept essentially parallel to the work surface. As a result the rollers can have a constant rotational force applied.

Figure 33:
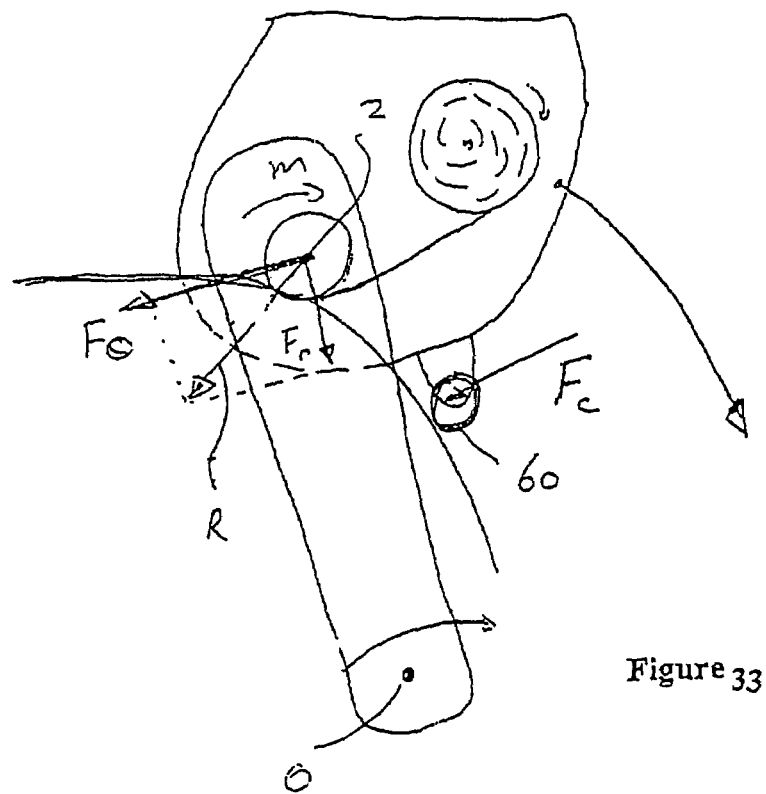
FIG. 33 is an example of a polar coordinate arrangement and wherein a carriage is provided to orient such aspects as the roll of edging, cut off devises and glue application means in an orientation constant to the edge of the panel.
Figure 34:
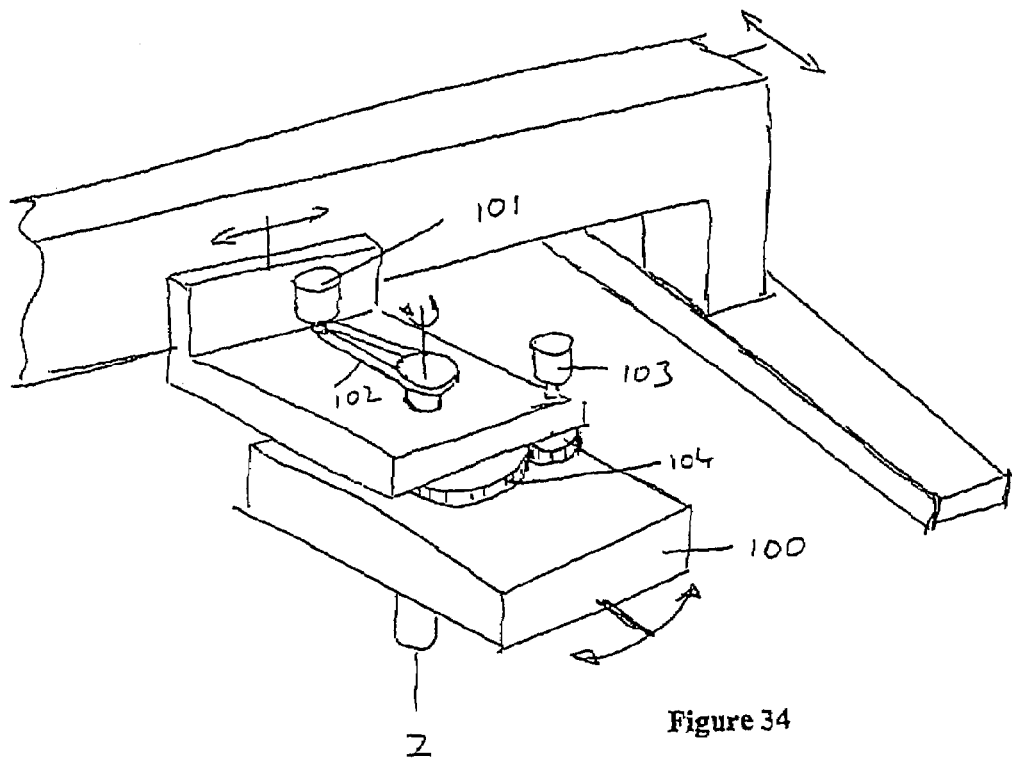
FIG. 34 is a perspective view of part of a set up utilizing the present invention in a cartesian coordinate frame and wherein the carriage may be moved by a motor to position the carriage appropriately relative to each of the objects.
Figure 35:
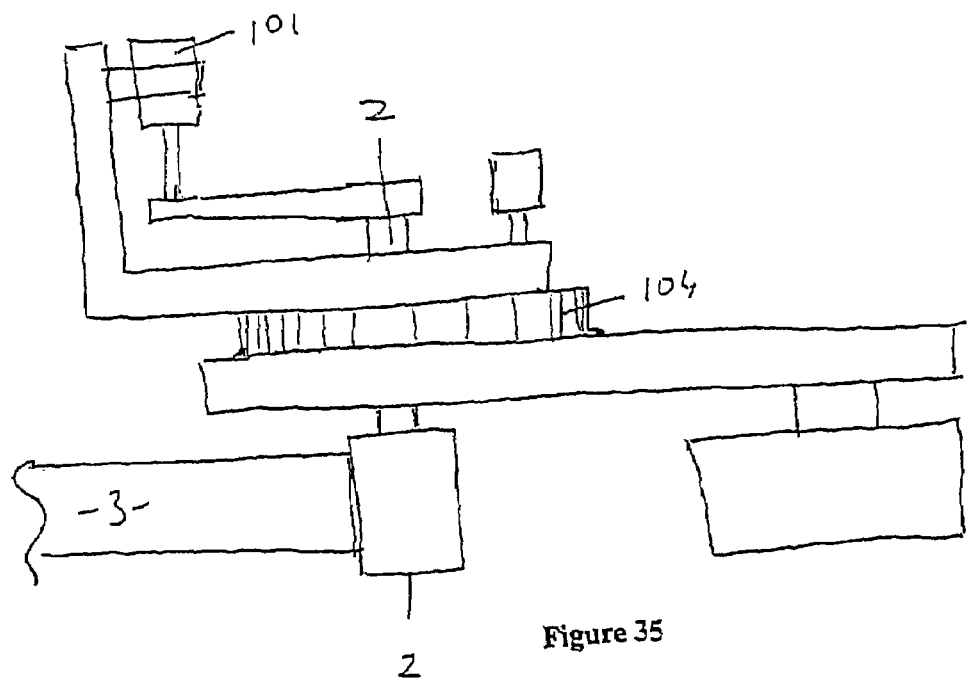
FIG. 35 is a side view of part of the arrangement as shown in FIG. 34.

With reference to FIGS. 33, 34 and 35, the carriage which may hold the saw, tape, gluing system etc is preferably mounted on a plate which can swivel anywhere from 0° to 360° about the "z" axis. It may be pneumatically driven in reliance on sensors to rotationally position it. The pneumatic ram may apply a constant moment M about the z axis such that a leading feeler roller is maintained in contact with the panel and thus aligns the carriage clear of the object. FIG. 33 illustrates the application of the moment M about point z to thereby ensure the leading roller 60 remains in contact with the edge of the object its force being defined by $F_c$ which is substantially equal to the product of the moment and the distance between the roller 60 and the edge follower. FIG. 33 is an example of a polar coordinate arrangement. The leading roller 60, can also be used to sense the angle of inclination of the surface at the point of contact of the edge follower with the edge of the panel and to thereby operate the force application means to ensure the desired direction of force is applied via the edge follower to the contact roller(s) onto the panel.

With the variable application of force in both the Cartesian or polar coordinate arrangements and in both positive and negative directions, the edge follower can be maintained in contact with the edge of the surface of the object wherein the slope of the edge may vary from anywhere between 0 and 360°.

One example of ensuring the carriage providing such things as the trimming devices and glue application means is maintained at a desirable orientation relative to the panel as the device travels around the edge of the panel, is as shown with reference to FIGS. 34 and 35. FIG. 34 is a perspective view of part of an arrangement wherein a carriage 100 is mounted to rotate about the z axis, the axis about which the contact roller rotates. A mechanism for driving the edge follower may include a motor 101 driving the contact roller via a belt drive 102. The carriage 100 is pivotable about the z axis of the contact roller and is rotatable responsive to feedback from for example the sensing means to rotate about the z axis to appropriately position the carriage relative to the object. Such rotation may be achieved by a motor 103 which may be geared to a gear plate 104 of the carriage. The motor 103 may apply a rotation to the carriage to thereby angularly position it, or alternatively the carriage may be provided with a feeler roller as for example shown in FIG. 33 and wherein the motor 103 can then provide a rotation to the carriage and maintain, once the feeler roller is in contact with the edge, a sufficient torque to keep that feeler roller in contact with the edge. In this situation the force application means will be such as to apply its vectored force in a direction to another edge roller other than the feeler roller of the device as described in FIG. 34. A or several edge contact rollers being other than a feeler roller will then be considered in terms of the direction and magnitude of the vectored force that is applied to the edge follower. In the arrangement of FIGS. 34 and 35, the feeler roller is provided to both keep the carriage in a desirable position relative to the panel, preferably keeping the carriage projecting away from the panel and also to provide the angle sensing mechanism for controlling the operation of the force application means. As mentioned before, the force application means may direct a or several contact rollers in a direction normal to the edge of the panel at which they are in contact but alternatively a slight force in or against the direction of travel of the edge follower relative to the panel may be provided by the force application means. With the use of a vectored force application means to vector the direction of force that is applied by the edge follower to the edge of the panel, and by such vectoring being controlled as a result from feedback of an angle sensor the present invention will not require numerical control to position the edge follower in accordance to a preprogrammed locus relative to the panel.

Those skilled in the art will appreciate how the apparatus as herein described is not a numerical control apparatus and hence offers numerous advantages over existing systems for modifying the edge profile of a planar object.

The invention claimed is:

1. An edging apparatus to perform an edge modification to an edge profile of a planar object, said apparatus comprising
    a fixed structure to which the planar object can be mounted,
    an edge follower movably mounted from said fixed structure and adapted to move along at least part of said edge profile of said planar object, an edge sensor capable of determining the slope of said profile at said edge follower relative to a fixed frame of reference, an active force controller acting between said fixed structure and said edge follower responsive to feedback from said edge sensor to directly act on said edge follower to control the direction of bias of said edge follower to be towards said planar object, said edge follower carrying a driven roller which engages with the edge of said planar object and is biased there against by said force controller to, upon said driven roller being rotationally driven, generate movement of said edge follower along at least part of said profile, and means for modifying said edge of said object carried by said edge follower.

2. The edging apparatus as claimed in claims 1, wherein said active force controller acts to bias said edge follower with a direction component normal to the direction of movement.

3. The edging apparatus as claimed in claims 1, wherein there is also a small component of direction of said force controller on said edge follower in a direction of movement of said edge follower along said edge profile.

4. The edging apparatus as claimed in claim 1, wherein a rotational force of said driven roller provides a rolling action to impart a displacement of said edge follower along said edge profile.

5. The edging apparatus as claimed in claim 1, wherein said driven roller is separate from said means for modifying.

6. The edging apparatus as claimed in claim 5, wherein such separate driven roller is engagable with said edge profile of said object and, relative to the direction of movement, is either advanced or trailing said means for modifying.

7. The edging apparatus as claimed in claim 1, wherein said apparatus is an edge tape application machine to apply tape to the edge of said object and includes a feeding means for feeding a tape material to said edge profile at the point where the following means is located at said edge profile, said application occurring at the means for modifying which is a pressure roller.

8. The edging apparatus as claimed in claim 7, wherein said feeding means is either passive or active in feeding the tape material.

9. The edging apparatus as claimed in claim 7, wherein said feeding means includes, prior to the tape reaching said pressure roller, an applicator to apply adhesive to the surface of said tape material to engage with said edge profile.

10. The edging apparatus as claimed in claim 7, wherein, in addition, said apparatus includes an applicator to apply adhesive to said edge profile of said object prior to said tape being applied thereto.

11. The edging apparatus as claimed in claim 1, wherein said edge sensor includes a two point contact with said edge proximate to the location of said edge follower to determine an angular orientation between said two points relative to said reference frame to thereby provide feedback to said force controller of the angular orientation at or approximate to the point where the driven roller is in contact with said edge profile, to thereby appropriately allow for control of the direction of bias of said force controller to said follower.

12. An apparatus for providing an edging material to the edge profile of an arbitrarily shaped planar object, said apparatus comprising a fixed structure to which said planar object can be mounted, an edge follower movably mounted from said fixed structure and adapted to move along at least part of said edge profile of said planar object, an edge sensor capable of determining a slope of said profile at said edge follower relative to a fixed frame of reference, an active force controller acting between said fixed structure and said edge follower responsive to feedback from said edge sensor to act directly on said edge follower to control a direction of bias of said edge follower towards said planar object, said edge follower carrying a driven roller which engages with the edge of said planar object to, upon said driven roller being rotationally driven, generate movement of said edge follower along at least part of said profile, whereby in use, the provision of an edging material to the edge profile of the arbitrarily shaped planar object occurs by the edging material being fed between a pressure roller of said edge follower and the edge profile, pressure roller providing a pressing force onto the edging material to press the edging material onto said edge profile.

13. A method of edge banding an edge of a planar panel comprising mounting a panel on a support structure, placing a pressure roller adjacent an edge of said panel, and whilst providing a feed of edge banding material to engage with said panel and which is fed onto said panel between the pressure roller and said panel, providing a rotation to an at least one rotating edge contact roller which is in contact with at least one of the edge of said panel, advancing said pressure roller and said edge contact roller along said edge while simultaneously depositing edge bonding material to the edge of said panel, and controlling the application of a vectored force to the edge contact roller, which is directly controlled in response to an angle of the panel at said edge contact roller to thereby press said edge contact roller against the edge of said panel.

14. An edge modification apparatus for modification of at least part of an edge of a substantially planar panel, said edge defining a perimeter of an arbitrary profile, said apparatus comprising:

a mount to mount said panel on a fixed structure, an edge follower including at least one edge contact roller to follow at least part of the perimeter of said panel, an edge follower support structure to allow displacement of said edge follower relative to said fixed structure and when in use, relative to said panel, an edge sensor capable of determining a slope of said profile at said edge follower relative to a fixed frame of reference, a force controller to directly apply a variable vectored force to said edge follower to press said at least one contact roller onto the edge of said panel, said force controller capable of vectoring the force applied to said edge follower relative to said fixed frame of reference and in response to the edge sensor, in a manner to vector the resultant force to said edge follower in a direction a) to press said at least one contact roller onto said edge, and b) substantially not along said edge, at least one of a contact roller and the at least one edge contact roller being a rotationally driven roller in contact with said panel and that when rotationally driven generates relative movement between said edge follower and said planar object to thereby induce movement of said edge follower along at least part of the profile, and said edge follower including means for modifying the edge of said panel as said edge follower progresses along said edge of said panel.

15. An edge modification apparatus for the modification of at least part of an edge of a substantially planar panel, said edge defining a perimeter of an arbitrary profile, said apparatus comprising:

a mount to mount said panel on a fixed structure, an edge follower including at least one edge contact roller to follow at least part of the perimeter of said panel, an edge follower support structure to allow displacement of said edge follower relative to said fixed structure and when in use, relative to said panel, an edge sensor capable of determining the slope of said profile at said edge follower relative to a fixed frame of reference, a force controller to directly apply a variable vectored force to said edge follower to press said at least one edge contact roller onto the edge of said panel, said force controller being capable of vectoring the force applied to said edge follower relative to said fixed frame of reference and in response to the edge sensor, in a manner to vector the resultant force to said edge follower in a direction
  a) to press said at least one edge contact roller onto said edge, and
  b) substantially not along said edge, save for a very small component in or against the direction of travel of said edge follower along said profile, at least one of a contact roller and the at least one edge contact roller being a rotationally driven roller in contact with said panel and when rotationally driven generates relative movement between said edge follower and said planar object to thereby induce movement of said edge follower along at least part of the profile, and said edge follower including means for modifying the edge of said panel as said edge follower progresses along said edge of said panel.

16. The edge modification apparatus as claimed in claim 1, wherein said at least one of the contact roller and the at least one edge contact roller is a rotationally driven roller having an axis of rotation substantially parallel to the normal of the major surfaces of said planar panel, wherein said driven roller is in use pressed against the edge of said panel to generate relative movement between said edge follower and said panel.

17. The edge modification apparatus as claimed in claim 1, wherein said means for modifying is an edge taping device adapted for the application of tape to the edge of said panel.

18. The edge modification apparatus as claimed in claim 1, wherein said edge follower is adapted for the application of tape to the edge of said panel.

19. The edge modification apparatus as claimed in claim 17, wherein said edge follower consists of a unit which includes a tape feeding means which in use supports a roll of tape and allows for the feed of tape onto the edge of said panel, and at least one pressure roller rotatable about an axis parallel to the normal of the major surfaces of said panel and in use presses said tape onto the edge of said panel.

20. The edge modification apparatus as claimed in claim 19, wherein said at least one pressure roller is a driven roller.

21. The edge modification apparatus as claimed in claim 19, wherein said at least one driven roller is provided in addition to said pressure roller.

22. The edge modification apparatus as claimed in claim 19, wherein said unit also includes a glue applicator to apply glue to the edge contact face of said tape prior to the edge contact face being pressed onto said edge.

23. The edge modification apparatus as claimed in claim 1, wherein said edge sensor is able to sense the angle of the profile of the edge where said edge follower is pressed relative to said frame of reference by being responsive to the angle defined between a feeler roller which is forced to remain in contact with the edge and said contact roller of said edge follower relative to said frame of reference.

24. The edge modification apparatus as claimed in claim 19, wherein said unit is rotatably mounted from said edge follower support structure, said rotation controlled by a biasing means to bias the rotation of said unit relative to said edge follower support structure in a rotational direction to press a leading or trailing edge contact roller to said first mentioned contact roller or rollers also engaged with the edge of said panel.

25. The edge modification apparatus as claimed in claim 24, wherein said leading or trailing roller is provided to be disposed from said unit such that the unit is positioned relative to the panel in a position to keep at least a major portion of said unit outside of the perimeter of the panel as the leading or trailer roller progresses about the perimeter.

26. The edge modification apparatus as claimed in claim 1, wherein said edge follower is capable of moving along the entire profile of said panel.

27. The edge modification apparatus as claimed in claim 1, wherein said mount mounts said panel in a non rotatable manner relative thereto.

28. The edge modification apparatus as claimed in claim 1, wherein said edge follower support structure is a gantry arrangement supported by and movable relative to said fixed structure, said gantry arrangement comprising
  a bridging portion located on said fixed structure and translationally movable relative there to along a first path of travel, and
  a traveler located on said bridging structure and translationally movable relative there to along a second path of travel being transverse to said first path, wherein said edge follower is mounted from said traveler to be displaced by said gantry arrangement in a cartesian coordinate frame of reference, relative to said fixed structure.

29. The edge modification apparatus as claimed in claim 28, wherein said transverse direction is at 90 degrees.

30. The edge modification apparatus as claimed in claim 28, wherein said edge follower is rotationally mounted from said traveler.

31. The edge modification apparatus as claimed in claim 30, wherein the axis of rotation of said edge follower to said traveler is parallel to the normal of the major surfaces of said panel.

32. The edge modification apparatus as claimed in claim 30, wherein said axis of rotation of said edge follower to said traveler is coaxial with the edge contact roller.

33. The edge modification apparatus as claimed in claim 1, wherein said edge follower support structure is a swing arm arrangement supported by and movable relative to said fixed structure, said swing arm arrangement comprising
   an arm pivotably located on said fixed structure about an axis of rotation, and
   a traveler provided to said arm translationally movable along at least part of said arm wherein said edge follower is mounted from said traveler to be displaced by said swing arm arrangement in a polar coordinate frame of reference, relative to said fixed structure.

34. The edge modification apparatus as claimed in claim 1, wherein said edge sensor provides feed back of the angle of said edge at said edge follower, where said at least one edge contact roller is pressed against the edge, relative to said frame of reference.

35. The edge modification apparatus as claimed in claim 1, wherein said edge sensor is defined by a means providing two point contact at two spaced apart points on said edge wherein an angle detection means is provided to determine the angle between said two points of contact relative to said frame of reference.

36. The edge modification apparatus as claimed in claim 1, wherein said means to provide two point contact are edge feelers.

37. The edge modification apparatus as claimed in claim 36, wherein said two edge feelers are biased in use towards said edge, and said edge feelers are engaged to each other to be pivoted about a common pivot axis.

38. The edge modification apparatus as claimed in claim 37, wherein said angle detection device operates to determine the angle of rotation of said axle.

39. The edge modification apparatus as claimed in claim 1, wherein said edge sensor includes an angle detection device to detect the angle between two of said edge contact rollers.

40. The edge modification apparatus as claimed in claim 1, wherein more than one said edge contact roller is present and one of said edge contact rollers is a feeler roller.

41. The edge modification apparatus as claimed in claim 40, wherein said feeler roller is in advance in the direction of travel, relative to said edge contact roller.

42. The edge modification apparatus as claimed in claim 40, wherein said feeler roller trails, in the direction of travel, the one edge contact roller.

43. The edge modification apparatus as claimed in claim 1, wherein said edge sensor includes an angle detection device to detect the angle between the at least one edge contact roller and a feeler roller which is disposed from said edge follower by a linkage arm, said linkage arm being pivotable about said edge follower and biased therefrom in a direction such that in use said feeler roller maintains contact with the edge of said panel throughout the operation of modification of at least part of the edge of the panel.

* * * * *